(12) United States Patent
Homma et al.

(10) Patent No.: US 10,682,637 B2
(45) Date of Patent: Jun. 16, 2020

(54) METHOD FOR PRODUCING CATALYST FIBROUS STRUCTURE

(71) Applicant: KAO CORPORATION, Tokyo (JP)

(72) Inventors: Taichi Homma, Haga-gun (JP); Satoshi Kodama, Haga-gun (JP); Kunio Matsui, Haga-gun (JP); Nobuhiko Okada, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 15/520,640

(22) PCT Filed: Nov. 17, 2015

(86) PCT No.: PCT/JP2015/082811
§ 371 (c)(1),
(2) Date: Apr. 20, 2017

(87) PCT Pub. No.: WO2016/080551
PCT Pub. Date: May 26, 2016

(65) Prior Publication Data
US 2017/0304814 A1    Oct. 26, 2017

(30) Foreign Application Priority Data

Nov. 20, 2014  (JP) .................................. 2014-235264
Nov. 20, 2014  (JP) .................................. 2014-235265

(51) Int. Cl.
*B01J 23/78*     (2006.01)
*B01J 35/06*     (2006.01)
(Continued)

(52) U.S. Cl.
CPC ............... *B01J 35/06* (2013.01); *B01J 23/78* (2013.01); *B01J 23/894* (2013.01);
(Continued)

(58) Field of Classification Search
None
See application file for complete search history.

(56) References Cited

U.S. PATENT DOCUMENTS 4,871,709 A   10/1989  Tatsushima et al.
5,059,576 A   10/1991  Kato et al.
(Continued)

FOREIGN PATENT DOCUMENTS

CN         1350507 A    5/2002
CN       103290672 A    9/2013
(Continued)

OTHER PUBLICATIONS

Japanese Decision to Grant a Patent for Japanese Application No. 2014-235265, dated Oct. 9, 2018.
(Continued)

*Primary Examiner* — Colin W. Slifka
(74) *Attorney, Agent, or Firm* — Birch, Stewart, Kolasch & Birch, LLP

(57) ABSTRACT

A catalyst fibrous structure having a catalyst metal carried on a fibrous structure, wherein (a) a Log differential micropore volume distribution curve thereof obtained by measurement using a mercury intrusion technique has a peak having a maximum micropore diameter in the range of from 0.1 μm to 100 μm: (b) a Log, differential micropore volume at the peak is 0.5 mL/g or more; and (c) an amount of a catalyst metal compound and a binder carried per unit volume is 0.05 g/mL or more. Also, a production method for producing a catalyst fibrous structure.

5 Claims, 6 Drawing Sheets

(51) Int. Cl.
| | |
|---|---|
| B01J 35/10 | (2006.01) |
| B01J 37/02 | (2006.01) |
| B01J 37/08 | (2006.01) |
| B01J 23/89 | (2006.01) |
| C04B 30/02 | (2006.01) |
| B01J 37/14 | (2006.01) |
| C10G 45/06 | (2006.01) |
| B01J 37/16 | (2006.01) |
| C11B 3/02 | (2006.01) |
| C04B 20/10 | (2006.01) |
| B01J 37/18 | (2006.01) |
| C11C 1/08 | (2006.01) |
| B01J 23/40 | (2006.01) |
| B01J 35/00 | (2006.01) |
| B01J 23/70 | (2006.01) |
| B01J 37/00 | (2006.01) |
| C04B 111/00 | (2006.01) |
| B01J 37/34 | (2006.01) |
| B01J 21/12 | (2006.01) |
| B01J 21/14 | (2006.01) |
| B01D 53/94 | (2006.01) |
| B01J 23/48 | (2006.01) |
| B01D 53/86 | (2006.01) |
| B01D 53/88 | (2006.01) |

(52) U.S. Cl.
CPC ....... B01J 23/8926 (2013.01); B01J 35/1047 (2013.01); B01J 35/1076 (2013.01); B01J 37/0219 (2013.01); B01J 37/0246 (2013.01); B01J 37/0248 (2013.01); B01J 37/08 (2013.01); B01J 37/14 (2013.01); B01J 37/16 (2013.01); B01J 37/18 (2013.01); C04B 20/1066 (2013.01); C04B 30/02 (2013.01); C10G 45/06 (2013.01); C11B 3/02 (2013.01); C11C 1/08 (2013.01); *B01D 53/8634* (2013.01); *B01D 53/88* (2013.01); *B01D 53/94* (2013.01); *B01D 2255/1023* (2013.01); *B01D 2255/2061* (2013.01); *B01D 2255/20746* (2013.01); *B01D 2255/20753* (2013.01); *B01D 2255/20769* (2013.01); *B01D 2255/92* (2013.01); *B01D 2255/9205* (2013.01); *B01D 2257/406* (2013.01); *B01J 21/12* (2013.01); *B01J 21/14* (2013.01); *B01J 23/40* (2013.01); *B01J 23/48* (2013.01); *B01J 23/70* (2013.01); *B01J 35/0026* (2013.01); *B01J 35/108* (2013.01); *B01J 37/0036* (2013.01); *B01J 37/343* (2013.01); *B01J 2523/00* (2013.01); *C04B 2111/0081* (2013.01); *C10G 2300/202* (2013.01)

(56) References Cited

U.S. PATENT DOCUMENTS

| | | |
|---|---|---|
| 5,155,083 A | 10/1992 | Yoshida et al. |
| 5,194,414 A | 3/1993 | Kuma |
| 5,294,584 A | 3/1994 | Yoshida et al. |
| 2003/0072699 A1 | 4/2003 | Tonkovich et al. |
| 2010/0056829 A1 | 3/2010 | Matsui et al. |

FOREIGN PATENT DOCUMENTS

| | | |
|---|---|---|
| CN | 103357399 A | 10/2013 |
| JP | 1-245850 A | 10/1989 |
| JP | 2-307532 A | 12/1990 |
| JP | 5-64745 A | 3/1993 |
| JP | 8-131849 A | 5/1996 |
| JP | 2002-326036 A | 11/2002 |
| JP | 2003-512150 A | 4/2003 |
| JP | 2005-52750 A | 3/2005 |
| JP | 2006-7156 A | 1/2006 |
| JP | 2008-110341 A | 5/2008 |
| JP | 2009-255047 A | 11/2009 |
| JP | 2010-95435 A | 4/2010 |
| JP | 2011-132626 A | 7/2011 |
| JP | 4974757 B2 | 7/2012 |
| WO | WO 00/26137 A1 | 5/2000 |
| WO | WO 01/00323 A1 | 1/2001 |
| WO | WO 01/28665 A1 | 4/2001 |
| WO | WO 2009/137110 A1 | 11/2009 |

OTHER PUBLICATIONS

International Preliminary Report on patentability for PCT/JP2015/082811 dated Feb. 22, 2017.
International Search Report for PCT/JP2015/082811 dated Mar. 15, 2016.
Written Opinion of the International Preliminary Examining Authority for PCT/JP2015/082811 dated Oct. 24, 2016.
Written Opinion of the International Searching Authority for PCT/JP2015/082811 dated Mar. 15, 2016.
Japanese Office Action, dated May 14, 2019, for Japanese Application No. 2015-212560, with an English translation.
Chinese Office Action and Search Report dated Sep. 17, 2019, for corresponding Chinese Patent Application No. 201580062977.9, with partial English translation.
Miura et al., "In situ synthesis of Ni/MgO catalysts on inorganic paper-like matrix for methane steam reforming" Chemical Engineering Journal, vol. 229, Available Jun. 27, 2013, pp. 515-521.

(a)

(b)

METHOD FOR PRODUCING CATALYST FIBROUS STRUCTURE

FIELD OF THE INVENTION

The present invention relates to a catalyst having a catalyst metal carried on a fibrous structure serving as a support, namely relates to a catalyst fibrous structure, and in particular relates to a catalyst fibrous structure favorable for use in various reactions depending on the carried catalyst metal. In addition, the present invention also relates to a method for producing a catalyst having a catalyst metal carried on a fibrous structure serving as a support and favorable for use in various reactions depending on the carried catalyst metal, namely a catalyst fibrous structure.

BACKGROUND OF THE INVENTION

Various types of catalyst structures formed by combining a catalyst metal and an inorganic fiber substrate are known, and are used in various applications for purification of exhaust gas, production of chemical products, etc.

JP-A-2009-255047 describes a honeycomb structure carrying a catalyst, in which the amount of the carried catalyst is from 100 to 400 g/L, and which has, in the Log differential pore size distribution curve relating to the pore size distribution according to a mercury intrusion technique, there are three peaks in a range of from 0.005 to 0.03 µm, in a range of from 1 to 15 µm and in a range of from 15 to 30 µm, respectively.

JP-A-2005-052750 describes a ceramic honeycomb catalyst for exhaust gas purification systems having a catalyst substance carried on a ceramic honeycomb structure, wherein the mean micropore diameter in partitions of the ceramic honeycomb structure is 15 µm or more, and the porosity in the partitions is from 50 to 80%.

JP-A-2008-545533 describes a catalyst containing silver carried on a support, wherein the support has micropores having a surface area of at least 1.3 $m^2/g$ and a median micropore diameter of more than 0.8 µm, and having a pore size distribution such that micropores having a diameter within a range of from 0.1 to 10 µm account for at least 80% of the entire micropore volume, and micropores having a diameter within a range of from 0.3 to 10 µm account for at least 80% of the total micropore volume of the micropores having a diameter within a range of from 0.1 to 10 µm. Those containing alumina as the support are described (claim 6, etc.).

Various catalyst structures having catalyst metal particles carried on a porous support are known, and some methods are known as production methods for them. For example, JP-B-4974757 describes producing a particles-carrying porous material by impregnating a porous material with a dispersion of particles, then rapidly cooling it to freeze water in voids thereof, and thereafter heating and drying it. JP-A-2011-132626 describes a technique of applying a photocatalyst dispersion to a fluffed fibrous cloth and drying it to enable the photocatalyst to be carried on the surface of the fibrous cloth. JP-A-2002-326036 discloses a technique of immersing an inorganic fibrous structure in an aqueous solution containing an active component element-having organic acid salt, a surfactant and a solvent, and drying and calcination the structure.

SUMMARY OF THE INVENTION

When a reaction is caused using a catalyst fibrous structure, it is considered that the reactivity depends on the amount of a carried catalyst metal, and therefore it is considered preferable to increase the amount of catalyst metal carried per unit volume of the catalyst fibrous structure. However, even though the amount of the carried catalyst metal is merely increased, a reactant cannot penetrate inside of the catalyst fibrous structure, and this may cause a problem in that the carried catalyst metal cannot work effectively. The present invention provides a catalyst fibrous structure, which has a larger amount of the carried catalyst metal per unit volume and provides an improved contact state between the catalyst metal and a reactant.

In addition, when a reaction is caused using a catalyst fibrous structure, it is considered that the reactivity depends on the amount of a carried catalyst metal, and therefore it is preferred to increase the amount of the carried catalyst metal per unit volume of the catalyst fibrous structure. However, according to the production methods described in JP-B-4974757, JP-A-2011-132626 and JP-A-2002-326036, a large amount of catalyst metal cannot be carried on a fiber substrate; there may be a problem in the retentivity of the carried catalyst metal; or further, there may be a problem in that, when a large amount of a catalyst is carried, the density thereof on a surface of a catalyst fiber stricture would increase to clog micropores and a reactant cannot penetrate inside of the catalyst fibrous structure, and this may rather deteriorate the performance. The present invention also provides a novel production method for a catalyst fibrous structure, which allows a large amount of a catalyst metal to be carried per unit volume and further maintains micropores in a fibrous structure thereby to provide an improved contact state between the catalyst metal and a reactant.

As one aspect thereof, the present invention is a catalyst fibrous structure having a catalyst metal carried on a fibrous structure, which satisfies all the following requirements (a), (b) and (c):

(a) a Log differential micropore volume distribution curve thereof obtained by measurement using a mercury intrusion technique has a peak having a maximum micropore diameter in the range of from 0.1 µm to 100 µm;

(b) a Log differential micropore volume at the peak is 0.5 mL/g or more; and (c) an amount of a catalyst metal compound and a binder carried per unit volume is 0.05 g/mL or more.

As another aspect thereof, the present invention is a production method for a catalyst fibrous structure having the following steps (1) to (5):

(1) a step of mixing a catalyst metal compound or a catalyst precursor, and an inorganic binder and a solvent;

(2) a step of grinding the obtained mixture to obtain a coating material of the catalyst metal compound or the catalyst precursor having a median particle diameter of 2 µm or less and a viscosity of from 10 mPa·s to 200 mPa·s;

(3) a step of impregnating a fibrous structure with the obtained coating material of the catalyst metal compound or the catalyst precursor to fill up voids of the fibrous structure with the coating material of the catalyst metal compound or the catalyst precursor;

(4) a step of heating and drying the resultant fibrous structure filled with the coating material of the catalyst metal compound or the catalyst precursor at a temperature not lower than the boiling point of the solvent; and (5) a step of heating and calcination the dried fibrous structure having the catalyst metal compound or the catalyst precursor adhered thereto at a temperature not lower than the dehydration temperature of the inorganic binder to obtain a catalyst fibrous structure.

The catalyst fibrous structure of the present invention satisfies the above-mentioned requirements (a) and (b), and thus has an improved contact state with a reactant, thereby exhibiting a good reactivity; and as the catalyst fibrous structure simultaneously satisfies the above-mentioned requirement (c), thereby exhibiting a high catalyst activity. In addition, the catalyst fibrous structure of the present invention is excellent in shape-working performance thereby to enable a larger amount of a catalyst metal to be charged in a reactor per the volume thereof, and it is further excellent in the contact state with a reactant and the catalyst activity, so that the catalyst performance per reactor can be enhanced.

The catalyst fibrous structure obtained according to the production method of the present invention has a large catalyst metal-carrying amount per unit volume, and therefor has a high catalyst activity; and in addition, since micropores structure in a fibrous structure can be maintained, the contact capability thereof with a reactant is improved, therefore exhibiting a good reactivity. Further, the production method of the present invention is excellent in shape-working performance for catalyst fibrous structures thereby to enable a larger amount of a catalyst metal to be charged in a reactor per unit volume, and it is further excellent in the retentivity, the contact capability and the reactivity of the catalyst metal, so that the performance thereof per a reactor can be enhanced.

EMBODIMENTS OF THE INVENTION

<Catalyst Fibrous Structure>

Figure 1:
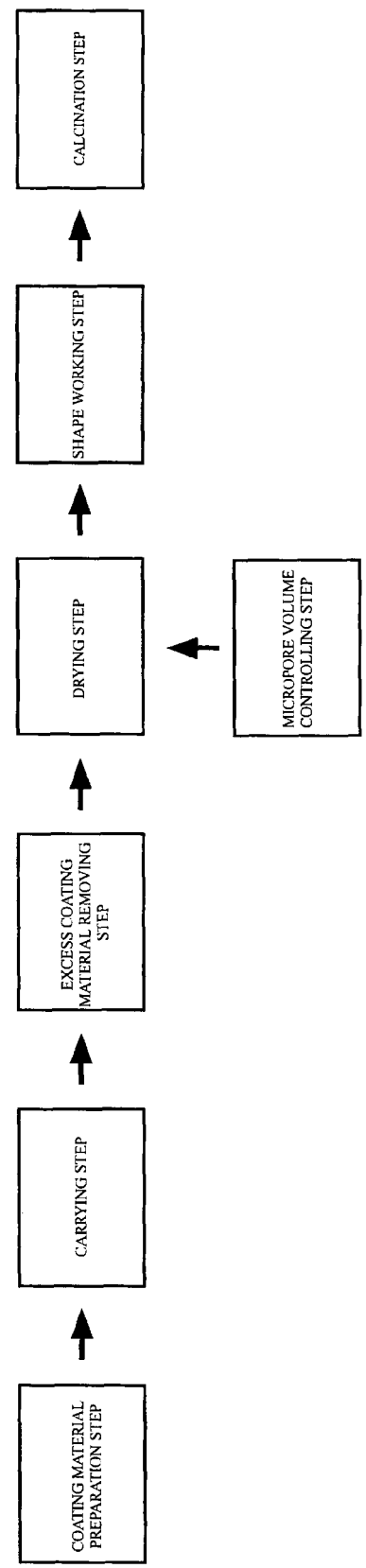
FIG. 1 is a view showing a flow of one example of a production method for a catalyst fibrous structure of the present invention.
Figure 2:
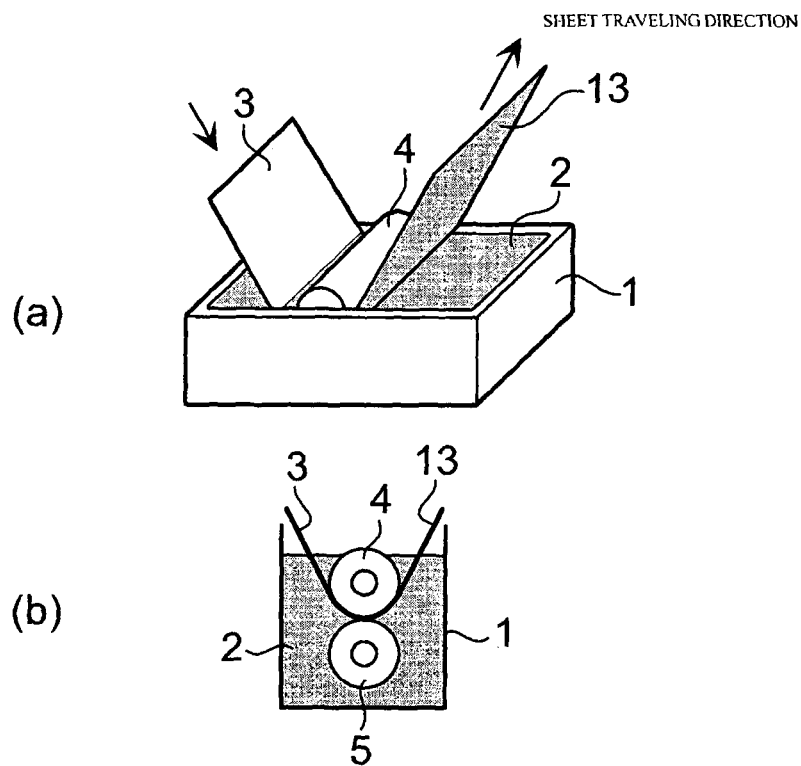
FIG. 2 is an explanatory view of a processing method in the carrying step in FIG. 1, in which (a) is a perspective view, and (b) is a cross-sectional view in the lengthwise direction along the sheet traveling direction in (a).

The catalyst fibrous structure of the present invention is one having a catalyst metal carried on a fibrous structure, and satisfies all the above-mentioned requirements (a), (b) and (c). Hereinafter, the measurement methods and the definitions relating to these requirements are described. In the following description, the catalyst metal is an element constituting a substance that exhibits a catalytic function for the intended reaction, in the catalyst fibrous structure. A compound containing the catalyst metal is referred to as a catalyst metal compound. In the case where the catalyst metal compound is an oxide of the catalyst metal, the compound is referred to as a catalyst metal oxide. The catalyst precursor is a compound to be a catalyst metal oxide by calcination.

Element (a)

A mercury intrusion technique is described, for example, in "Functionality of Substances (4th Ed., Experimental Chemistry Course 12, edited by the Chemical Society of Japan, published by Maruzen Company, Limited, p. 486)", etc. According to the mercury intrusion technique, a micropore diameter can be calculated using the following equation.

$$D = -4\gamma \cos \theta / P$$

wherein D represents a micropore diameter, γ represents the surface tension of mercury, θ represents a contact angle, and P represents a pressure. The surface tension of mercury is 482.536 mN/m, and the contact angle thereof in use is, for example, 130°. The micropore diameter distribution can be determined by gradually changing the pressure to be given to mercury, measuring the volume of mercury having penetrated into the micropores at that time, that is, measuring the micropore volume V, drawing the relationship between the micropore diameter D calculated according to the above-mentioned equation and the micropore volume, and drawing a graph in which the vertical axis is the Log differential coefficient dV/d(Log D) of the relational curve and the horizontal axis is the micropore diameter D. This graph is referred to as a Log differential micropore volume distribution curve.

The requirement (a) is that, of the peaks in the Log differential micropore volume distribution curve according to the mercury intrusion technique, the peak having a maximum micropore diameter is from 0.1 μm to 100 μm. From the viewpoint of substance mobility that a reactant penetrates into the depth of the catalyst fibrous structure and reacts, and the reaction product moves toward the outside of the catalyst fibrous structure, the peak is preferably 1 μm or more, more preferably 10 μm or more, and is preferably 70 μm or less, more preferably 50 μm or less, that is preferably within a range of from 1 μm to 70 μm, more preferably within a range of from 10 μm to 50 μm.

Requirement (b)

The value of the vertical axis in the peak having a maximum micropore diameter, that is, the value of Log differential coefficient dV/d(Log D) is defined as the Log differential micropore volume (b) at the maximum peak. The requirement (b) is that the Log differential micropore volume at the maximum peak is 0.5 mL/g or more. A higher value of the requirement (b) indicates that many micropores having a predetermined size region exist inside the structure, and indicates that the structure has voids suitable for reaction. From the viewpoint of mobility of a reactant and a reaction product, (b) is preferably 0.7 mL/g or more, more preferably 1 mL/g or more. From the viewpoint of the compatibility with (c) the amount of the catalyst metal compound and the binder carried per unit volume of the catalyst fibrous structure, the Log differential micropore volume (b) at the maximum peak is preferably 8 mL/g or less, more preferably 4 mL/g or less, further preferably 3 mL/g or less, furthermore preferably 2 mL/g or less.

Requirement (c)

The amount of the catalyst metal compound and the binder carried per unit volume (c) is defined by the following equation.

Amount of carried catalyst metal compound and binder [g/mL]=mass of carried catalyst metal compound and binder [g]/volume of catalyst fibrous structure [mL]

Here, mass of carried catalyst metal compound and binder [g]=mass of catalyst fibrous structure [g]−mass of fibrous structure before carrying catalyst [g], and for example, in the case of a sheet material, catalyst fibrous structure volume [mL]=area of catalyst fibrous structure [m$^2$]×thickness of catalyst fibrous structure [m]. The requirement (c) means that the amount of the catalyst metal compound and binder carried per unit volume is 0.05 g/mL or more. From the viewpoint of increasing the catalyst activity, (c) is preferably such that the amount of the carried catalyst metal compound and binder is 0.2 g/mL or more, more preferably 0.4 g/mL or more.

From the viewpoint of securing good compatibility between the requirements (b) and (c), that is, from the viewpoint of securing good compatibility between the Log differential micropore volume at the maximum peak (b) and the amount of the carried catalyst metal compound and binder per unit volume, the amount of the carried catalyst metal compound and binder per unit volume (c) is preferably 1.0 g/mL or less, more preferably 0.8 g/mL or less, further preferably 0.7 g/mL or less, furthermore preferably 0.6 g/mL or less.

The amount of the carried catalyst metal per unit mass of the catalyst fibrous structure is, from the viewpoint of the activity of the catalyst, preferably 0.01 g/g or more, more preferably 0.1 g/g or more, further preferably 0.15 g/g or more, furthermore preferably 0.2 g/g or more, furthermore preferably 0.25 g/g or more, and is, from the viewpoint of the activity of the catalyst per the mass of the catalyst metal, preferably 0.8 g/g or less, more preferably 0.6 g/g or less, furthermore preferably 0.5 g/g or less, furthermore preferably 0.4 g/g or less, furthermore preferably 0.35 g/g or less.

The amount of the carried catalyst metal per unit volume of the catalyst fibrous structure is, as the catalyst metal and from the viewpoint of the ability thereof to sufficiently adsorb a reactant inside the catalyst, preferably 0.01 g/mL or more, more preferably 0.1 g/mL or more, and is, from the viewpoint of the activity of the catalyst per the mass of the catalyst metal, preferably 1.0 g/mL or less, more preferably 0.8 g/mL or less, further preferably 0.6 g/mL or less, furthermore preferably 0.4 g/mL or less, furthermore preferably 0.3 g/mL or less.

The fibrous structure is a molded body of fibers, and the shape and the size thereof are not limited. The structure may be a sheet-like, tabular, cylindrical, honeycomb-like or amorphous one, but in view of the workability thereof into desired shapes depending on the use thereof, preferred are sheet-like, fabric, cloth-like, filmy or tabular ones, and more preferred are sheet-like, fabric or cloth-like ones. The fibrous structure may be a long strip-shaped one, and for example, it may be used as a form wound up like a roll. When the fibrous structure is a sheet-like, fabric or cloth-like one, woven materials, knitted materials, woven fabrics or nonwoven fabrics may be used as the sheet-like, fabric or cloth-like structure, and from the viewpoint of the micropore volume inside the structure and the uniformity of the pore size distribution, more preferred are nonwoven fabrics.

In the case where the fibrous structure is a sheet-like, fabric or cloth-like one, the thickness thereof is, from the viewpoint of improving the strength of the catalyst fibrous structure, preferably 0.1 mm or more, more preferably 0.5 mm or more, further preferably 0.8 mm or more, and is, from the viewpoint of improving the diffusibility of a reactant from inside the catalyst and improving the diffusibility of a reaction product from inside the catalyst by shortening the diffusion distance of a reactant and a reaction product inside the catalyst fibrous structure, thereby improving the catalyst activity, preferably 10 mm or less, more preferably 5 mm or less.

The bulk density of the fibrous structure is, from the viewpoint of the charging amount when the catalyst fibrous structure is charged in a reactor, preferably 10 kg/m$^3$ or more, more preferably 100 kg/m$^3$ or more, further preferably 150 kg/m$^3$ or more, and is, from the viewpoint of easiness in diffusion of a reactant inside the catalyst fibrous structure and of reducing the pressure loss when a fluid runs through the catalyst fibrous structure, preferably 2400 kg/m$^3$ or less, more preferably 1000 kg/m$^3$ or less, further preferably 500 kg/m$^3$ or less, furthermore preferably 300 kg/m$^3$ or less, furthermore preferably 250 kg/m$^3$ or less.

As the fibrous structure, usable is one formed of inorganic fibers. The inorganic fibers include one type of fibers selected from metal oxide fibers, metal nitride fibers, metal carbide fibers, carbon fibers and the like, and mixed fibers of a combination of two or more of those fibers. The metal oxide fibers include one type of fibers selected from silica fibers, alumina fibers, calcia fibers, magnesia fibers, alumina-silica fibers, calcia-silica fibers, magnesia-silica fibers, calcia-magnesia-silica fibers and the like, and mixed fibers of a combination of two or more of those fibers. Preferred is use of one type of fibers elected from metal oxide fibers, glass fibers and carbon fibers, or mixed fibers of a combination of two or more of those fibers. More preferred is use of one type of fibers selected alumina-silica fibers, calcia-magnesia-silica fibers and glass fibers, or mixed fibers of a combination of two or more of those fibers. Further preferred is use of a combination of alumina-silica fibers and glass fibers.

Preferably, the fibers have an aspect ratio (ratio of the diameter of the cross section of the fiber to the length of the fiber) of 5 or more, more preferably 10 or more, further preferably 20 or more, and preferably 100000 or less, more preferably 10000 or less, further preferably 5000 or less, furthermore preferably 1000 or less. The mean diameter of the fibers is, from the viewpoint that the fibrous structure can maintain the shape and can maintain the catalyst activity, preferably 0.1 μm or more, more preferably 0.2 μm or more, further preferably 0.5 μm or more, furthermore preferably 1 μm or more, and is, from the viewpoint of increasing the amount of the carried catalyst metal, preferably 50 μm or less, more preferably 30 μm or less, further preferably 10 μm or less.

The catalyst metal may be selected from known catalyst metals. In the catalyst fibrous structure of the present invention, a catalyst metal compound adheres to the fibers themselves constituting the fibrous structure to be a support therein, and is thereby carried in the voids between the fibers. The catalyst fibrous structure may have the same shape as the fibrous structure, or may be further worked into a shape easy to use depending on the intended use thereof.

The catalyst fibrous structure of the present invention may be used in various reactions depending on the carried catalyst metal therein. For example, it may be used for reduction, oxidation, substitution, decomposition, addition, cyclization, ring opening, transfer reaction, etc. The reduction includes hydrogenation, oxygen removal reaction, and hydrogenation desulfurization. The oxidation includes dehydrogenation, oxygen addition reaction, etc. The substitution reaction includes substitution reaction with hydrogen, halogen, hydroxy, oxygen, nitrogen, sulfur, etc. The decomposition includes solvolysis, hydrolysis, ammonia decomposition, hydrogenolysis, oxidation decomposition, etc. The addition reaction includes addition to a C—C double bond, a C—C triple bond, a C—O bond, a C—N bond, etc. The cyclization reaction includes reaction through condensation, removal, polymerization, etc. The ring opening reaction includes reaction through hydrogenation, hydration, etc. The transfer reaction includes isomerization, racemization, disproportionation reaction, etc.

Regarding the reaction source material, the catalyst fibrous structure is usable for hydrocarbons, halogenohydrocarbons, alcohols, ethers, ketones, aldehydes, carboxylic acids, nitro compounds, sulfur-containing compounds, phosphorus-containing compounds, etc. In addition, for example, in the case of using the catalyst fibrous structure in a process of finally producing alcohols (monoalcohols and polyalcohols) from source materials of oils, fats or fatty acid esters, a Ni-containing catalyst fibrous structure may be used as a catalyst for reducing the amount of the sulfur compound (that is, a hydrogenation catalyst-poisoning substance) in the source materials in a process of purifying the source material, or for reducing the amount of the sulfur compounds in the fatty acid esters in the later step, and a Co-containing catalyst fibrous structure may be used as a hydrogenation catalyst in the hydrogenations step for fatty acids or fatty acid esters.

<Production Method for Catalyst Fibrous Structure>

The catalyst fibrous structure of the present invention can be produced according to the production flow of the steps shown in FIG. 1.

<Coating Material Preparation Step>

The coating material preparation step is a step of mixing a catalyst metal compound or a catalyst precursor, and a binder and a solvent to prepare a coating material. In the following description, a coating material of a catalyst metal compound or a catalyst precursor is referred to as a catalyst metal compound coating material, or a catalyst precursor coating material. The catalyst metal compound coating material where the catalyst metal compound is a catalyst metal oxide is referred to as a catalyst metal oxide coating material.

<Catalyst Metal>

The catalyst metal may be any component effective for the chemical reaction to which it is applied, and includes metal elements such as Ag, Au, Cu, Ni, Fe, Al, Co, Period-4 transition metal elements, platinum elements, Group-3 elements in the Periodic Table, alkali metals, alkaline earth metals, etc. The catalyst metal compound includes metal oxides, metal hydroxides, metal salts and the like of the above-mentioned catalyst metals. In addition, as the catalyst metal compound or the catalyst precursor, also usable is a powdery catalyst metal carried by a porous material. The catalyst metal or the catalyst metal compound or the catalyst precursor may be mixed with an inorganic binder and a solvent. The porous material is to be a support to carry the catalyst metal compound or the catalyst precursor, and includes active carbon, alumina, silica, zeolite, titania, silica-alumina, diatomaceous earth, etc., and preferred is use of one or more porous materials selected from these. More preferred is use of a porous material having a large surface area, and in addition, molecular sieve or the like is also usable. For the method of making a catalyst metal compound or a catalyst precursor carried by a support, employable is any known method of ordinary impregnation method, co-impregnation method, co-precipitation method, ion-exchange method, etc.

<Binder>

The binder is preferably one excellent in bindability of a powdery catalyst metal compound or a catalyst precursor with each other or bindability thereof to the surface of a fibrous structure, resistant to the reaction environment and not having any negative influence on the reaction system. As the binder of the type, usable are an organic binder, an inorganic binder, and an organic/inorganic hybrid binder. As the organic binder, usable are cellulose resins such as carboxymethyl cellulose, hydroxyethyl cellulose, etc.; fluororesins such as polytetrafluoroethylene, polyvinylidene fluoride, etc.; various thermoplastic resins and thermosetting resins, such as polyvinyl alcohol, urethane resin, epoxy resin, polyamide resin, polyimide resin, polyamideimide resin, polyester resin, phenol resin, melamine resin, silicone resin, etc. Also usable are those prepared by introducing crosslinking reaction with a curing agent into these synthetic resins to further increase the molecular weight of the resultant resins. Above all, from the viewpoint of increasing the amount of the carried catalyst and from the viewpoint of increasing the reactivity thereof, preferred are thermosetting resins such as phenol resin, furan resin, epoxy resin and the like; and more preferred is use of thermosetting resins that involve condensation reaction during curing. As the organic/inorganic hybrid binder, usable are siloxane bond-having compounds such as organic silanes, etc. Also usable are compounds whose molecular weight can be increased through crosslinking reaction.

According to the production method of the present invention, a catalyst metal compound or a catalyst precursor, and an inorganic binder and a solvent are mixed to produce a mixture.

<Inorganic Binder>

The inorganic binder is preferably one excellent in bindability of a powdery catalyst metal compound or a catalyst precursor with each other or bindability thereof to the surface of a fibrous structure, resistant to the reaction environment and not having any negative influence on the reaction system. The inorganic binder is preferably a metal oxide, more preferably one or more selected from aluminium oxide, silicon oxide, cerium oxide, antimony oxide, titanium oxide, zirconium oxide, magnesium oxide, and calcium oxide. Also usable are one or more selected from oxide sols of alumina, silica, titania, zirconia, ceria or the like, and capable of producing bindability through drying and heat treatment. Above all, preferred is colloidal silica or colloidal alumina having a primary particle diameter of smaller than 50 nm.

<Solvent>

The solvent may be any one not having any negative influence on the catalyst activity of the catalyst metal, and may be selected from various water-soluble or water-insoluble ones depending on the type of the binder to be used. For example, as the solvent, usable are water; alcohols having from 1 to carbon atoms, such as methyl alcohol, ethyl alcohol, isopropyl alcohol, butyl alcohol, allyl alcohol, etc.; ketones such as acetone, methyl ethyl ketone (MEK), methyl isobutyl ketone (MIBK), etc. The solvent amount may be determined in consideration of the operability in the subsequent steps, but from the viewpoint of the amount of the carried catalyst metal, the solvent amount in the mixture is preferably from 50% by mass to 90% by mass.

The solvent may contain a surfactant as a dispersant. As the surfactant, any suitable one may be used depending on the type of the catalyst metal compound or the catalyst precursor to be used. As the surfactant, for example, usable are anionic surfactants, cationic surfactants, ampholytic surfactants, nonionic surfactants, and polymer surfactants. The usable anionic surfactants include carboxylate surfactants, sulfonate surfactants, phosphate surfactants, etc. The usable cationic surfactants include tetraalkylammonium salts, etc. The usable ampholytic surfactants include alkylamine oxides, alkylbetaines, etc. The usable nonionic surfactants include alkyl glucosides, fatty acid amides, polyoxyethylene alkyl ethers, polyoxyethylene glycols, polyvinyl alcohols, etc. The usable polymer surfactants include polycarboxylic acids, polysulfonic acids, copolymers of polyacrylic acid and polyacrylamide, etc. The surfactant content is, from the viewpoint of realizing good dispersibility, preferably 2% by mass or more relative to the mass of the catalyst metal compound or the catalyst precursor in the coating material, more preferably 8% by mass or more, and is, from the viewpoint of the retentivity of the fibrous structure in the coating material, preferably 20% by mass or less, more preferably 15% by mass or less.

Mixing the catalyst metal compound or the catalyst precursor with the inorganic binder and the solvent can be attained, for example, by shaking. According to the production method of the present invention, the resultant mixture may be ground into particles to be a coating material having a median particle diameter of 2 μm or less and a viscosity of from 10 mPa·s to 200 mPa·s. In the coating material preparation step, employable is a process of mixing and grinding the necessary components in one stage, using a media-assisted mill or a paint shaker, to thereby provide a coating material, and also employable is a method of mixing and grinding the components in two stages of preliminary mixing and main mixing, to thereby prepare a coating material. Preferred is the method of preparing a coating material in a mode of two-stage mixing and grinding treatment of preliminary mixing and subsequent main mixing. For example, employable is a method of mixing the components in preliminary mixing using a paint shaker with beads (for example glass beads), and further mixing them in subsequent main mixing using a media-assisted mill described in JP-A No. 2008-110341, paragraph 0047 (for example, Apex Mill manufactured by Kotobuki Industry Co., Ltd.). In the case of using a media-assisted mill, the grains size of the media (beads) to be used in the main mixing step is preferably sufficiently smaller than the grain size of the media (beads) to be used in the preliminary mixing step, and for example, the former is preferably 50% or less of the diameter of the beads used in the preliminary mixing, more preferably 30% or less, further preferably 20% or less.

Also employable is a method of mixing the components using a non-media beadless disperser. For example, employable is a method of using a thin-film revolution-type high-speed mixer (Filmix (registered trademark), manufactured by Primix Corporation), or an emulsifying disperser (Milder (registered trademark), manufactured by Matsubo Corporation).

In the coating material preparation step, it is desirable to prepare a catalyst metal compound coating material or a catalyst precursor coating material according to the above-mentioned mixing method, in which the maximum peak of the particle diameter of the catalyst metal compound or the catalyst precursor in the particle size distribution thereof, as measured through laser diffractometry using a particle sizer (SALD-300V manufactured by Shimadzu Corporation), is 2 μm or less, preferably 1 μm or less, more preferably 0.8 μm or less. In that manner, by producing a catalyst metal compound coating material or a catalyst precursor coating material having a small particle size in the mode of two-stage mixing composed of preliminary mixing and main mixing, it favorably becomes easy to make the catalyst metal compound coating material or the catalyst precursor coating material penetrate into the voids of the fibrous structure in the next step of a carrying step.

In the coating material preparation step in the production method of the present invention, particles are ground to have a median particle diameter of 2 μm or less, according to the above-mentioned mixing method. For example, the particles are dispersed to such that the median particle diameter of the catalyst metal compound or the catalyst precursor, as well as the binder could be 2 μm or less in the particle size distribution thereof measured through laser diffractometry. The median particle diameter is preferably 1 μm or less, more preferably 0.8 μm or less. By producing a catalyst metal compound coating material or a catalyst precursor coating material having a small particle diameter through the grinding treatment, it becomes easy to allow the catalyst metal compound coating material or the catalyst precursor coating material to penetrate into the voids of the fibrous structure during impregnation of the coating material. The particle diameter is, from the dispersibility of the coating material, preferably 0.1 μm or more, more preferably 0.2 μm or more, further preferably 0.3 μm or more.

The viscosity (20° C.) of the coating material is, from the viewpoint of increasing the retentivity after impregnation, 10 mPa·s or more, preferably 20 mPa·s or more, more preferably mPa·s or more, further preferably 50 mPa·s or more, furthermore preferably 60 mPa·s or more, furthermore preferably 70 mPa·s or more, and is, from the viewpoint of the impregnation processability, 200 mPa·s or less, preferably 180 mPa·s or less, more preferably 160 mPa·s or less, further preferably 140 mPa·s or less, and falls from 10 mPa·s to 200 mPa·s, preferably from 20 mPa·s to 180 mPa·s, more preferably from 30 mPa·s to 160 mPa·s, further preferably 50 mPa·s to 140 mPa·s, furthermore preferably from 60 mPa·s to 140 mPa·s, furthermore preferably from 70 mPa·s to 140 mPa·s.

The viscosity (20° C.) of the catalyst metal compound coating material or the catalyst precursor coating material is, from the viewpoint of realizing uniform and effective carrying of the catalyst metal, preferably 10 mPa·s or more, preferably 20 mPa·s or more, further preferably 30 mPa·s or more, furthermore preferably 50 mPa·s or more, furthermore preferably 60 mPa·s or more, furthermore preferably 70 mPa·s or more, and is preferably 200 mPa·s or less, more preferably 180 mPa·s or less, further preferably 160 mPa·s or less, furthermore preferably 140 mPa·s or less, and falls preferably from 10 mPa·s to 200 mPa·s, more preferably from 20 mPa·s to 180 mPa·s, further preferably from 30 mPa·s to 160 mPa·s, furthermore preferably from 50 mPa·s to 140 mPa·s, furthermore preferably from 60 mPa·s to 140 mPa·s, furthermore preferably from 70 mPa·s to 140 mPa·s.

In the coating material, from the viewpoint of increasing the amount of the carried catalyst metal, the total solid content of the catalyst metal compound or the catalyst precursor, and the binder is preferably 10% by mass or more, more preferably 20% by mass or more, further preferably 25% by mass or more; and is, from the viewpoint of improving the dispersibility of the catalyst metal compound or the catalyst precursor and the binder in the coating material and improving the penetration property of the coating material into the fibrous structure to enable the catalyst metal to be uniformly carried, preferably 50% by mass or less, more preferably 45% by mass or less, further preferably 40% by mass or less, and is preferably from 10% by mass to 50% by mass, more preferably from 20% by mass to 45% by mass, further preferably from 25% by mass to 40% by mass.

The proportion of the catalyst metal compound or the catalyst precursor, and the binder in the coating material is, from the viewpoint of increasing the catalyst activity, preferably such that the catalyst metal compound or the catalyst precursor accounts for 70% by mass or more of the total amount of the catalyst metal compound or the catalyst precursor and the binder, more preferably 73% by mass or more, further preferably 76% by mass or more, and preferably 90% by mass or less, more preferably 87% by mass or less, further preferably 83% by mass or less, and is preferably from 70% by mass to 90% by mass, more preferably from 73% by mass to 87% by mass, further preferably from 76% by mass to 83% by mass. From the viewpoint of realizing good carrying performance, the binder preferably accounts for 10% by mass or more, more preferably 13% by mass or more, further preferably 17% by mass or more, and is, from the viewpoint of increasing the catalyst activity, preferably 30% by mass or less, more preferably 27% by mass or less, further preferably 24% by mass or less, and is preferably from 10% by mass to 30% by mass, more preferably from 13% by mass to 27% by mass, further preferably from 17% by mass to 24% by mass.

The coating material may contain the above-mentioned surfactant as a dispersant, in an amount as mentioned above. As the surfactant, any suitable one may be used depending on the type of the catalyst metal compound or the catalyst precursor to be used.

According to the production method of the present invention, a fibrous structure is impregnated with the resultant catalyst metal compound or catalyst precursor coating material, and voids of the fibrous structure are thereby filled up with the catalyst metal compound or catalyst precursor coating material. As described above, the fibrous structure is a molded body of fibers, and those formed of inorganic fibers may be used.

The micropore volume per unit mass of the fibrous structure for use in the present invention is, from the viewpoint of the easiness in diffusion of a reactant inside the catalyst fibrous structure, preferably 0.1 mL/g or more, more preferably 0.15 mL/g or more, further preferably 0.6 mL/g or more, furthermore preferably 0.9 mL/g or more, furthermore preferably 1 mL/g or more, furthermore preferably 1.1 mL/g or more, furthermore preferably 1.2 mL/g or more, furthermore preferably 2 mL/g or more, furthermore preferably 3 mL/g or more, furthermore preferably 3.5 mL/g or more. From the viewpoint of increasing the amount of the carried catalyst metal, the volume is preferably 10 mL/g or less, more preferably 7.5 mL/g or less, further preferably 7 mL/g or less, furthermore preferably 5 mL/g or less.

The porosity of the fibrous structure for use in the present invention is, from the viewpoint of the easiness in diffusion of a reactant inside the catalyst fibrous structure, preferably 30% or more, more preferably 40% or more, further preferably 50% or more, furthermore preferably 55% or more, furthermore preferably 60% or more, furthermore preferably 70% or more, furthermore preferably 80% or more. Also from the viewpoint of the strength retentivity of the catalyst fibrous structure, the porosity is preferably 99% or less, more preferably 95% or less, further preferably 93% or less. The micropore diameter in the fibrous structure is, from the viewpoint of the coating material penetrability during impregnation with the catalyst coating material, preferably 1 μm or more, more preferably 5 μm or more, further preferably 10 μm or more. Also from the viewpoint of the coating material retentivity after impregnation with the catalyst coating material, the micropore diameter is preferably 200 μm or less, more preferably 150 μm or less, further preferably 100 μm or less.

As the method for impregnating a fibrous structure with a catalyst metal compound coating material or a catalyst precursor coating material, there may be employed a method of immersing a fibrous structure in a catalyst metal compound coating material or a catalyst precursor coating material in a container, or a method of sinking a fibrous structure to run through a catalyst metal compound coating material or a catalyst precursor coating material put in a container. As the method of filling up the voids in a fibrous structure with a catalyst metal compound coating material or a catalyst precursor coating material, preferably employed is a method of applying external pressure to a fibrous structure kept in contact with a catalyst metal compound coating material or a catalyst precursor coating material. Thus applying external pressure thereto, the catalyst metal compound coating material or the catalyst precursor coating material can be carried uniformly in the voids in the fibrous structure, and the amount of the catalyst metal compound coating material or catalyst precursor coating material carried per volume can be thereby increased. As the method of applying external pressure, there may be employed a method of using a roll or a method of giving ultrasonic vibration. The impregnation may include a step of removing any excess of catalyst metal compound coating material or catalyst precursor coating material adhered to the surface of the fibrous structure, from the fibrous structure in which the catalyst metal compound coating material or the catalyst precursor coating material has been carried. The step may lower the drop-off rate of the catalyst metal compound or the catalyst precursor contained in the catalyst metal compound coating material or the catalyst precursor coating material.

According to the production method of the present invention, the fibrous structure is, while the voids therein are kept filled with the coating material, heated and dried at a temperature not lower than the boiling point of the solvent used in preparing the coating material. By drying the fibrous structure while the voids therein are filled with the catalyst metal compound coating material or the catalyst precursor coating material, the catalyst metal compound or the catalyst precursor can be uniformly carried without being unevenly distributed inside the fibrous structure. At the same time, the fibrous structure may be compressed to control the micropore volume therein. Specifically in the drying step, evaporation removal of the solvent by drying gives voids (micropores) in the fibrous structure to increase the porosity, but the fibrous structure is compressed to control the micropore volume. In compressing, it is desirable that the fibrous structure is compressed to change little the area of the fibrous structure. After dried, the fibrous structure may be worked into a shape in accordance with the intended use thereof, by cutting, deforming or the like. For example, the fibrous structure may be worked into honeycomb-shaped, cylindrical or other structures with sheets coated multiply, etc.

According to the production method of the present invention, the dried fibrous structure is calcined by heating at a temperature not lower than the dehydration temperature of the inorganic binder. Using an inorganic material as the fibrous structure enables the calcination step, and by carrying out the calcination step, the strength of the catalyst fibrous structure can be thereby increased. In the catalyst fibrous structure thus obtained, the catalyst metal compound or the catalyst precursor is adhered to and carried on the fibers themselves constituting the voids in the fibrous structure to be a support therein. The catalyst fibrous structure may have the same shape as that of the fibrous structure, or may be further worked into a shape easy to use in accordance with the intended use thereof.

The catalyst fibrous structure thus obtained according to the production method of the present invention may be used in the above-mentioned various reactions in accordance with the catalyst metal carried therein.

The micropore diameter at the maximum peak in the catalyst fibrous structure obtained according to the production method of the present invention is, from the viewpoint of the easiness in diffusion of a reaction substrate inside the catalyst, preferably 0.1 μm or more, more preferably 1 μm or more, further preferably 10 μm or more. Also from the viewpoint of the amount of the carried catalyst metal and the easiness in adsorption of a reaction substrate inside the catalyst fibrous structure, the micropore diameter is preferably 100 μm or less, more preferably 70 μm or less, further preferably 50 μm or less.

The Log differential micropore volume at the maximum peak micropore diameter in the catalyst fibrous structure obtained according to the production method of the present invention is, from the viewpoint of the easiness in diffusion of a reactant inside the catalyst fibrous structure, preferably 0.5 mL/g or more, more preferably 0.7 mL/g or more, further preferably 1.0 mL/g or more. Also from the viewpoint of increasing the amount of the carried catalyst metal, the micropore volume is preferably 8 mL/g or less, more preferably 4 mL/g or less, further preferably 3 mL/g or less, furthermore preferably 2 mL/g or less.

The micropore volume per unit mass of the catalyst fibrous structure obtained according to the production method of the present invention is, from the viewpoint of the easiness in diffusion of a reactant inside the catalyst fibrous structure, preferably 0.5 mL/g or more, more preferably 0.7 mL/g or more, further preferably 1.2 mL/g or more. Also from the viewpoint of increasing the amount of the carried catalyst metal, the micropore volume is preferably 4 mL/g or less, more preferably 3 mL/g or less, further preferably 2 mL/g or less.

The amount of the carried catalyst metal compound and binder per unit volume of the catalyst fibrous structure obtained according to the production method of the present invention is, from the viewpoint of improving the reactivity, preferably 0.05 g/mL or more, more preferably 0.2 g/mL or more, further preferably 0.4 g/mL or more, and is, from the viewpoint of reducing the pressure loss in passing of a reactant through the catalyst fibrous structure, preferably 1.0 g/mL or less, more preferably 0.8 g/mL or less, further preferably 0.7 g/mL or less, furthermore preferably 0.6 g/mL or less.

<Production Method for Catalyst Fibrous Structure>

Exemplary examples of the production method of the present invention are described below with reference to FIG. 1 to FIG. 5. FIG. 1 shows, as one example of the production method of the present invention, a flow including a coating material preparation step, a carrying step, an excess coating material removing step, a drying step, a micropore volume controlling step, a shape working step and a calcination step.

<Coating Material Preparation Step>

The coating material preparation step is a step of mixing a catalyst metal compound or a catalyst precursor, a binder and a solvent and grinding them to provide a coating material (coating material preparation), thereby preparing a coating material having a median particle diameter of 2 μm or less and a viscosity of from 10 mPa·s to 200 mPa·s. This has been described hereinabove as mixing and coating material preparation.

<Carrying Step>

As preferred treatment methods for the carrying step, there are mentioned the following methods (I) to (IV). The carrying step is a step of enabling the above-mentioned fibrous structure to be impregnated with and to carry the catalyst metal compound coating material or the catalyst precursor coating material prepared in the coating material preparation step. According to the carrying step, the voids inside the fibrous structure can be readily filled with the catalyst metal compound coating material or the catalyst precursor coating material.

(I) This is a method of submerging a fibrous structure in the catalyst metal compound coating material or the catalyst precursor coating material to enable the fibrous structure to be impregnated and to carry. A fibrous structure is placed in a container filled with the catalyst metal compound coating material of the catalyst precursor coating material prepared in the coating material preparation step, whereby the catalyst metal compound coating material or the catalyst precursor coating material can penetrate into voids in the fibrous structure and the fibrous structure can thus carry therein the catalyst metal compound coating material or the catalyst precursor coating material.

(II) As shown in FIGS. 2(a) and (b), this is a method of enabling a catalyst metal compound coating material or a catalyst precursor coating material to be infiltrated in and carried on a fibrous structure by a treatment step of submerging the fibrous structure in the coating material. A container 1 is filled with a coating material 2, and a pair of rolls 4 and 5 is arranged in the container 1. Here, the coating material 2 is a catalyst metal compound coating material or a catalyst precursor coating material. The pair of rolls 4 and 5 is so arranged that at least the facing surfaces thereof close to each other could be positioned in the coating material 2. A fibrous structure (fiber sheet) 3 runs through the coating material 2 and passes between the pair of rolls 4 and 5. At that time, the fibrous structure 3 is pressed between the pair of rolls 4 and 5 on both sides thereof, and therefore the coating material 2 penetrates into the voids in the fibrous structure 3 to provide a fibrous structure 13 that carries and is impregnated with the catalyst metal compound coating material or the catalyst precursor coating material. The distance between the pair of rolls 4 and 5 is preferably so controlled as to be slightly smaller than the thickness of the fibrous structure 3, or to be from 0.95 times to 0.98 times the thickness thereof.

Figure 3:
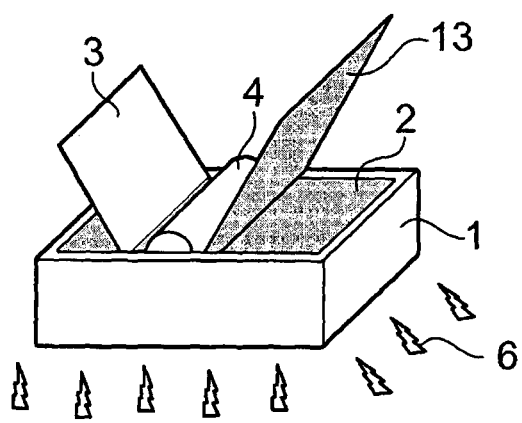
FIG. 3 is an explanatory view of another processing method in the carrying step in FIG. 1.

(III) As shown in FIG. 3, an ultrasonic vibration 6 (shown by a vibration image) may be given to the inside of a container 1 from the outside of the bottom of the container 1 in a state where the fibrous structure 3 is placed in the container 1 filled with the coating material 2. FIG. 3 shows a single roll 4, but the method (III) may not use a roll. By giving an ultrasonic vibration, the coating material 2 can penetrate into the voids in the fibrous structure 3 and can be carried thereon, thereby giving the fibrous structure 13 that carries and is impregnated with the catalyst metal compound coating material or the catalyst precursor coating material. A preferred frequency of the ultrasonic wave is from 15 to 50 kHz.

(IV) This is a method of giving an ultrasonic vibration to the inside of the container 1 from the outside of the bottom of the container 1, in carrying out the method (I). Specifically in FIG. 3, this is a method of giving an ultrasonic vibration while using a pair of rolls like the method (II).

Figure 4:
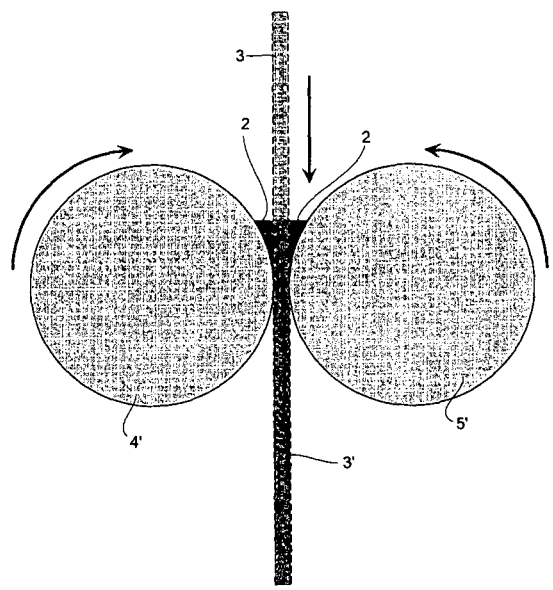
FIG. 4 is an explanatory view of still another processing method in the carrying step in FIG. 1.

(V) As shown in FIG. 4, the fibrous structure 3 is fed in the vertical direction toward the arrowed direction from the top, between rolls 4' and 5' that are paired with each other in the horizontal direction, whereby the coating material 2 can be fed in the space formed between the rolls 4' and 5' rotating in the arrowed direction and both faces of the fibrous structure 3. Accordingly, owing to the self-weight of the coating material 2 and the pressure given to the rolls 4' and 5', there can be obtained a fibrous structure 3' that carries and is impregnated with the catalyst metal compound coating material or the catalyst precursor coating material.

<Excess Catalyst Coating Material Removing Step>

After a fibrous structure is impregnated with a coating material of a catalyst metal compound or a catalyst precursor to fill up the voids of the fibrous structure with the coating material, if necessary, a step of removing the excess coating material may be carried out. The step may lower the drop-off rate of the catalyst metal compound or the catalyst precursor in a shape working step (the catalyst metal compound or the catalyst precursor contained in the catalyst metal compound coating material or the catalyst precursor coating material). In the excess coating material removing step, the excess coating material adhering to the outer surface of the fibrous structure that carries the coating material as above may be removed. One having penetrated into the inside of the fibrous structure (into the voids of the fibers of the fibrous structure) is not contained in the excess coating material. For example, in FIG. 5, removers 7 and 8 each corresponding to the surface profile of the fibrous structure 13 are kept in contact with the side of one end of the surface (in the case of a fiber sheet, both surfaces) of the fibrous structure 13 that carries the coating material 2. While the contact state is kept as such, the removers 7 and 8 are moved from one end to the other end (in the arrowed direction in FIG. 5) to give the fibrous structure 23 from which the excess coating material has been removed.

Figure 5:
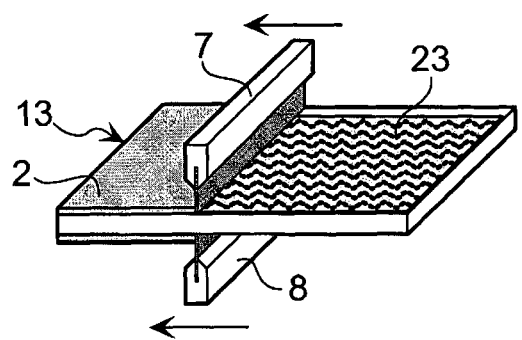
FIG. 5 is an explanatory view of a processing method in the removing step in FIG. 1.

The removers 7 and 8 are ones compatible with the surface profile of the fibrous structure 13, and blades, brushes, porous members and the like are usable. The porous members include woven fabric, nonwoven fabric, plastic foam (sponge), ceramic foam, filter paper, etc. Preferably, for excess coating material removal, the removers 7 and 8 are moved only once from one end to the other end, but the removers 7 and 8 may be moved twice or more in the same direction for the removal. The excess coating material that has been removed in this step may be reused in the carrying step. In FIG. 5, two removers 7 and 8 are used, but one remover alone may be used to remove the excess coating material on one surface of the fibrous structure 13, and then the fibrous structure 13 may be turned upside down and the same process may be carried out repeatedly. In FIG. 5, the fibrous structure 13 is kept laid in the horizontal direction during the removal operation, but may be kept standing in the vertical direction during the operation.

<Drying Step and Micropore Volume Controlling Step>

The drying step is a step of drying the fibrous structure from which the excess coating material has been removed. The drying may be either drying under heat or spontaneous drying (including drying with air at room temperature), but preferred is drying under heat. Preferred is a heating and drying method at a temperature not lower than the boiling point of the solvent used in the coating material preparation step. In the drying step, the fibrous structure from which the excess coating material has been removed is, while kept filled with the catalyst metal compound coating material or the catalyst precursor coating material in the voids therein, heated and dried at a temperature not lower than the boiling point of the solvent used in the coating material preparation step. The temperature is, from the viewpoint of maintaining the micropore structure, preferably $(Tg+10)°$ C. or higher relative to the boiling point $(Tb)°$ C. of the solvent, more preferably $(Tg+20)°$ C. or higher, and is preferably $(Tg+80)°$ C. or lower, more preferably $(Tg+50)°$ C. or lower. For example, in the case where water is used as the solvent, the temperature is preferably 110° C. or higher, relative to the boiling point thereof 100° C., more preferably 120° C. or higher, and is preferably 180° C. or lower, more preferably 150° C. or lower. In the case where isopropyl alcohol is sued as the solvent, the temperature is preferably 92° C. or higher, relative to the boiling point thereof 82° C., more preferably 102° C. or higher, and is preferably 162° C. or lower, more preferably 132° C. or lower. In this case, the fibrous structure may be compressed at the same time so as to control the micropore diameter and the micropore volume. This is referred to a micropore volume controlling step or a volume controlling step. Specifically, in the drying step, the solvent is removed through evaporation by drying to give voids (micropores) in the fibrous structure, whereby the porosity is increased, but the micropore diameter and the micropore volume may be controlled by compression.

In controlling the micropore volume by compression as described above, it is desirable that the micropore volume is controlled by compression without changing the area of the fibrous structure. For example, in the case where the fibrous structure is a sheet, it is desirable that the sheet is compressed to control the micropore volume. The compression ratio of the fibrous structure in controlling the micropore volume by compression (apparent volume before compression/apparent volume after compression) is preferably 1.0 or more and 2.5 or less, and more preferably 1.0 or more and 1.8 or less.

<Shape Working Step>

The shape working step is a step of working the dried fibrous structure to give a catalyst fibrous structure, and is carried out optionally. Shape working includes cutting, deforming and the like, and means to provide a desired shape in accordance with the intended use. The shape to be formed by working may be suitably determined in accordance with the use of the catalyst fibrous structure, and for example, the structure may be worked into honeycomb-shaped, cylindrical or other structures with sheets coated multiply, etc.

<Calcination Step>

After the shape working step, if desired, a calcination step may be added. The calcination step may increase the strength of the resultant catalyst fibrous structure and the catalyst metal compound would hardly drop off. The calcination step may be carried out in the case where the fibrous structure is formed of inorganic fibers and/or metal fibers. The calcination step can increase the strength of the resultant fibrous structure. The calcination step is carried out by heating the catalyst fibrous structure up to a temperature not lower than the dehydration temperature of the inorganic binder. The dehydration temperature of the inorganic binder is a temperature at which surface free water, adhering water, essential water, crystal water or the like of the inorganic binder may be removed, or a temperature at which dehydration may occur through condensation from the surface hydroxyl group of the inorganic binder. By heating the structure at a temperature not lower than the dehydration temperature of the inorganic binder, the catalyst and the fibrous structure may be firmly bound via the inorganic binder. The calcination temperature may fall within a range not having any negative influence on the catalyst activity, and may be selected in accordance with the type of the inorganic binder to be used. For example, when a colloidal alumina is used as the inorganic binder, the temperature is preferably not lower than 200° C. at which adhering water may be removed, and is more preferably not lower than 400° C. at which essential water may be removed. For example, when a colloidal silica is used as the inorganic binder, the temperature is preferably not lower than 400° C. at which adhering water may be removed, and is more preferably not lower than 500° C. at which dehydration from the hydroxyl group therein may occur.

Preferred embodiments of the catalyst fibrous structure of the present invention are shown below.

<1-1>

A catalyst fibrous structure having a catalyst metal carried on a fibrous structure, which satisfies all the following requirements (a), (b) and (c):

(a) a Log differential micropore volume distribution curve thereof obtained by measurement using a mercury intrusion technique has a peak having a maximum micropore diameter in the range of from 0.1 μm to 100 μm;

(b) a Log differential micropore volume at the peak is 0.5 mL/g or more; and (c) an amount of a catalyst metal compound and a binder carried per unit volume is 0.05 g/mL or more.

<1-2>

The catalyst fibrous structure according to <1-1>, wherein the peak appears at preferably 1 μm or more, more preferably 10 μm or more, and preferably 70 μm or less, more preferably 50 μm or less, and preferably within the range of from 1 μm to 70 μm, more preferably within the range of from 10 μm to 50 μm.

<1-3>

The catalyst fibrous structure according to any of <1-1> or <1-2>, wherein the Log differential micropore volume at the peak having the maximum micropore diameter is preferably 0.7 mL/g or more, more preferably 1 mL/g or more.

<1-4>

The catalyst fibrous structure according to any of <1-1> to <1-3>, wherein the Log differential micropore volume at the peak having the maximum micropore diameter is preferably 8 mL/g or less, more preferably 4 mL/g or less, further preferably 3 mL/g or less, furthermore preferably 2 mL/g or less.

<1-5>

The catalyst fibrous structure according to any of <1-1> to <1-4>, wherein the amount of the catalyst metal compound and the binder carried per unit volume in the requirement (c) is preferably 0.2 g/mL or more, more preferably 0.4 g/mL or more.

<1-6>

The catalyst fibrous structure according to any of <1-1> to <1-5>, wherein the amount of the catalyst metal compound and the binder carried per unit volume in the requirement (c) is preferably 1.0 g/mL or less, more preferably 0.8 g/mL or less, further preferably 0.7 g/mL or less, furthermore preferably 0.6 g/mL or less.

<1-7>

The catalyst fibrous structure according to any of <1-1> to <1-6>, wherein the amount of the catalyst metal carried per unit mass of the catalyst fibrous structure is preferably 0.01 g/g or more, more preferably 0.1 g/g or more, further preferably 0.15 g/g or more, furthermore preferably 0.2 g/g or more, furthermore preferably 0.25 g/g or more, and is preferably 0.8 g/g or less, more preferably 0.6 g/g or less, further preferably 0.5 g/g or less, furthermore preferably 0.4 g/g or less, furthermore preferably 0.35 g/g or less.

<1-8>

The catalyst fibrous structure according to any of <1-1> to <1-7>, wherein the amount of the catalyst metal carried per unit volume of the catalyst fibrous structure is, as the catalyst metal therein, preferably 0.01 g/mL or more, more preferably 0.1 g/mL or more, and is preferably 1.0 g/mL or less, more preferably 0.8 g/mL or less, further preferably 0.6 g/mL or less, furthermore preferably 0.4 g/mL or less, furthermore preferably 0.3 g/mL or less.

<1-9>

The catalyst fibrous structure according to any of <1-1> to <1-8>, wherein the fibrous structure is a sheet-like, fabric or cloth-like one, and the thickness thereof is preferably 0.1 mm or more, more preferably 0.5 mm or more, further preferably 0.8 mm or more, and is preferably 10 mm or less, more preferably 5 mm or less.

<1-10>

The catalyst fibrous structure according to any of <1-1> to <1-9>, wherein the bulk density of the fibrous structure is preferably 10 kg/m$^3$ or more, more preferably 100 kg/m$^3$ or more, further preferably 150 kg/m$^3$ or more, and is preferably 2400 kg/m$^3$ or less, more preferably 1000 kg/m$^3$ or less, further preferably 500 kg/m$^3$ or less, furthermore preferably 300 kg/m$^3$ or less, furthermore preferably 250 kg/m$^3$ or less.

<1-11>

The catalyst fibrous structure according to <1-10>, wherein the sheet-like, fabric or cloth-like structure is a woven material, a knitted material, a woven fabric or a nonwoven fabric, preferably a nonwoven fabric.

<1-12>

The catalyst fibrous structure according to any of <1-1> to <1-11>, wherein the fibrous structure is formed of an inorganic fiber.

<1-13>

The catalyst fibrous structure according to <1-12>, wherein the inorganic fiber is of one type or a mixed fiber of a combination of two or more types selected from metal oxide fibers, metal nitride fibers, metal carbide fibers and carbon fibers.

<1-14>

The catalyst fibrous structure according to <1-13>, wherein the metal oxide fiber is of one type or a mixed fiber of a combination of two or more types selected from silica fibers, alumina fibers, calcia fibers, magnesia fibers, alumina-silica fibers, calcia-silica fibers, magnesia-silica fibers, and calcia-magnesia-silica fibers.

<1-15>

The catalyst fibrous structure according to <1-12>, wherein the fibrous structure is formed of at least one type or a mixed fiber of a combination of two or more types selected from metal oxide fibers, glass fibers and carbon fibers.

<1-16>

The catalyst fibrous structure according to <1-12>, wherein the fibrous structure is formed of at least one type or a mixed fiber of a combination of two or more types selected from alumina-silica fibers, calcia-magnesia-silica fibers and glass fibers.

<1-17>

The catalyst fibrous structure according to <1-16>, wherein the fibrous structure is formed of a combination of an alumina-silica fiber and a glass fiber.

<1-18>

The catalyst fibrous structure according to any of <1-1> to <1-17>, wherein the fibrous structure is a fiber sheet.

<1-19>

The catalyst fibrous structure according to any of <1-1> to <1-18>, wherein the catalyst metal is carried on the fibrous structure by bringing a coating material prepared by mixing a catalyst metal compound or a catalyst precursor, and a binder and a solvent, into contact with the fibrous structure.

<1-20>

The catalyst fibrous structure according to <1-19>, wherein the amount of the catalyst metal compound or the catalyst precursor relative to the total amount of the catalyst metal compound or the catalyst precursor, and the binder in the coating material is preferably 70% by mass or more, more preferably 73% by mass or more, further preferably 76% by mass or more, and preferably 90% by mass or less, more preferably 87% by mass or less, further preferably 83% by mass or less, and is preferably from 70% by mass to 90% by mass, more preferably from 73% by mass to 87% by mass, further preferably from 76% by mass to 83% by mass.

<1-21>

The catalyst fibrous structure according to <1-19> or <1-20>, wherein the amount of the binder relative to the total amount of the catalyst metal compound or the catalyst precursor, and the binder in the coating material is preferably 10% by mass or more, more preferably 13% by mass or more, further preferably 17% by mass or more, and preferably 30% by mass or less, more preferably 27% by mass or less, further preferably 24% by mass or less, and is preferably from 10% by mass to 30% by mass, more preferably from 13% by mass to 27% by mass, further preferably from 17% by mass to 24% by mass.

Preferred embodiments of the production method of the present invention are shown below.

<2-1>

A production method for a catalyst fibrous structure having the following steps (1) to (5):

(1) a step of mixing a catalyst metal compound or a catalyst precursor, and an inorganic binder and a solvent;

(2) a step of grinding the resultant mixture to obtain a coating material of the catalyst metal compound or the catalyst precursor having a median particle diameter of 2 μm or less and a viscosity of from 10 mPa·s to 200 mPa·s;

(3) a step of impregnating a fibrous structure with the obtained coating material of the catalyst metal compound or the catalyst precursor to fill up voids of the fibrous structure with the coating material of the catalyst metal compound or the catalyst precursor;

(4) a step of heating and drying the resultant fibrous structure filled up with the coating material of the catalyst metal compound or the catalyst precursor at a temperature not lower than the boiling point of the solvent; and (5) a step of heating and calcination the dried fibrous structure having the catalyst metal compound or the catalyst precursor adhered thereto at a temperature not lower than the dehydration temperature of the inorganic binder to obtain a catalyst fibrous structure.

<2-2>

The production method according to <2-1>, wherein the catalyst metal compound or the catalyst precursor contains a metal element selected from Ag, Au, Cu, Ni, Fe, Al, Co, Period-4 transition metal elements, platinum elements, Group-3 elements in the Periodic Table, alkali metals and alkaline earth metals.

<2-3>

The production method according to <2-1> or <2-2>, wherein the catalyst metal compound or the precursor is a powdery catalyst metal carried on a porous material.

<2-4>

The production method according to any of <2-1> to <2-3>, wherein the porous material is one or more selected from active carbon, alumina, silica, zeolite, titania, silica-alumina, diatomaceous earth, and molecular sieve.

<2-5>

The production method according to any of <2-1> to <2-4>, wherein the inorganic binder is at least one or more selected from alumina, silica, titania, zirconia and ceria.

<2-6>

The production method according to any of <2-1> to <2-5>, wherein the inorganic binder is selected from colloidal silica and colloidal alumina.

<2-7>

The production method according to any of <2-1> to <2-6>, wherein the proportion of the catalyst metal compound or the catalyst precursor, and the binder is such that the catalyst metal compound or the catalyst precursor accounts for 70% by mass or more of the total amount of the catalyst metal compound or the catalyst precursor, and the binder, preferably 73% by mass or more, more preferably 76% by mass or more, and accounts for 90% by mass or less, preferably 87% by mass or less, more preferably 83% by mass or less, and accounts for from 70% by mass to 90% by mass, preferably from 73% by mass to 87% by mass, more preferably from 76% by mass to 83% by mass.

<2-8>

The production method according to any of <2-1> to <2-7>, wherein the proportion of the catalyst metal compound or the catalyst precursor, and the binder is such that the binder accounts for 10% by mass or more of the total amount of the catalyst metal compound or the catalyst precursor, and the binder, preferably 13% by mass or more, more preferably 17% by mass or more, and accounts for 30% by mass or less, preferably 27% by mass or less, more preferably 24% by mass or less, and accounts for from 10% by mass to 30% by mass, preferably from 13% by mass to 27% by mass, more preferably from 17% by mass to 24% by mass.

<2-9>

The production method according to any of <2-1> to <2-8>, wherein the fibrous structure is a fiber sheet formed of at least one type selected from metal oxide fibers, glass fibers and carbon fibers.

<2-10>

The production method according to any of <2-1> to <2-9>, wherein the fibrous structure is a fiber sheet formed of at least one type selected from silica fibers, alumina fibers, glass fibers and carbon fibers.

<2-11>

The production method according to any of <2-1> to <2-10>, wherein the fibrous structure is a fiber sheet formed of at least one type selected from alumina-silica fibers, calcia-magnesia-silica fibers, and glass fibers.

<2-12>

The production method according to any of <2-1> to <2-11>, wherein the fibrous structure is a fiber sheet formed of a combination of an alumina-silica fiber and a glass fiber.

<2-13>

The production method according to any of <2-1> to <2-12>, wherein the porosity of the fibrous structure is 30% or more, preferably 40% or more, more preferably 50% or more, further preferably 55% or more, furthermore preferably 60% or more, furthermore preferably 70% or more, furthermore preferably 80% or more, and is 99% or less, preferably 95% or less, more preferably 93% or less.

<2-14>

The production method according to any of <2-1> to <2-13>, wherein the micropore volume per unit mass of the fibrous structure is 0.1 mL/g or more, preferably 0.15 mL/g or more, more preferably 1 mL/g or more, further preferably 0.15 mL/g or more, furthermore preferably 0.6 mL/g or more, furthermore preferably 0.9 mL/g or more, furthermore preferably 1 mL/g or more, furthermore preferably 1.1 mL/g or more, furthermore preferably 1.2 mL/g or more, furthermore preferably 2 mL/g or more, furthermore preferably 3 mL/g or more, furthermore preferably 3.5 mL/g or more, and is 10 mL/g or less, preferably 7.5 mL/g or less, more preferably 7 mL/g or less, further preferably 5 mL/g or less.
<2-15>
The production method according to any of <2-1> to <2-14>, wherein the micropore diameter in the fibrous structure is 1 or more, preferably 5 μm or more, more preferably 10 μm or more, and is 200 μm or less, preferably 150 ∞m or less, more preferably 100 μm or less.
<2-16>
The production method according to any of <2-1> to <2-15>, wherein the amount of the catalyst metal compound and the binder carried per unit volume of the catalyst fibrous structure is 0.05 g/mL or more, more preferably 0.2 g/mL or more, further preferably 0.4 g/mL or more, and is preferably 0.8 g/mL or less, more preferably 0.7 g/mL or less, further preferably 0.6 g/mL or less.
<2-17>
The production method according to any of <2-1> to <2-16>, wherein the micropore volume at micropore diameters of the maximum peak of the catalyst fibrous structure is 0.5 mL/g or more, preferably 0.7 mL/g or more, more preferably 1.0 mL/g or more, and is 8 mL/g or less, preferably 4 mL/g or less, more preferably 3 mL/g or less, further preferably 2 mL/g or less.
<2-18>
The production method according to any of <2-1> to <2-17>, wherein the median particle diameter in the coating material of the catalyst metal compound or the catalyst precursor is preferably 1 μm or less, more preferably 0.8 μm or less, and is preferably 0.1 μm or more, more preferably 0.2 μm or more, further preferably 0.3 μm or more.
<2-19>
The production method according to any of <2-1> to <2-18>, wherein the solid content of the coating material of the catalyst metal compound or the catalyst precursor is preferably 10% by mass or more, more preferably 20% by mass or more, further preferably 25% by mass or more, and is preferably 50% by mass or less, more preferably 45% by mass or less, further preferably 40% by mass or less.
<2-20>
The production method according to any of <2-1> to <2-19>, wherein the viscosity of the coating material of the catalyst metal compound or the catalyst precursor is 10 mPa·s or more, preferably 20 mPa·s or more, more preferably 30 mPa·s or more, further preferably 50 mPa·s or more, furthermore preferably 60 mPa·s or more, furthermore preferably 70 mPa·s or more, and is 200 mPa·s or less, preferably 180 mPa·s or less, more preferably 160 mPa·s or less, further preferably 140 mPa·s or less.
<2-21>
The production method according to any of <2-1> to <2-20>, wherein the coating material of the catalyst metal compound or the catalyst precursor contains a surfactant.
<2-22>
The production method according to <2-21>, wherein the content of the surfactant is, in the coating material of the catalyst metal compound or the catalyst precursor, 2% by mass or more relative to the mass of the catalyst metal compound or the catalyst precursor, preferably 8% by mass or more, and is 20% by mass or less, preferably 15% by mass or less.

<2-23>
The production method according to any of <2-1> to <2-22>, wherein the mixing and grinding treatment is carried out using a bead disperser.
<2-24>
The production method according to any of <2-1> to <2-22>, wherein the mixing and grinding treatment is carried out using a beadless disperser.
<2-25>
The production method according to any of <2-1> to <2-24>, wherein the fibrous structure is a sheet-like, fabric or cloth-like one, and the thickness thereof is 0.1 mm or more, preferably 0.5 mm or more, more preferably 0.8 mm or more, and is 10 mm or less, preferably 5 mm or less.
<2-26>
The production method according to any of <2-1> to <2-25>, wherein the bulk density of the fibrous structure is 10 kg/m$^3$ or more, preferably 100 kg/m$^3$ or more, more preferably 150 kg/m$^3$ or more, and is 2400 kg/m$^3$ or less, preferably 1000 kg/m$^3$ or less, more preferably 500 kg/m$^3$ or less, further preferably 300 kg/m$^3$ or less, furthermore preferably 250 kg/m$^3$ or less.
<2-27>
The production method according to any of <2-1> to <2-26>, including a step of removing an excess of catalyst coating material adhered to the surface of the fibrous structure after impregnation.
<2-28>
The production method according to any of <2-1> to <2-27>, wherein the heating and drying step includes a step of adjusting a micropore volume by compressing the fibrous structure.
<2-29>
The production method according to any of <2-1> to <2-28>, wherein the fibrous structure is compressed during heating and drying, and the compression ratio (thickness before compression/thickness after compression) is more than 1.0 and 2.5 or less.
<2-30>
The production method according to <2-29>, wherein the compression ratio (apparent volume before compression/apparent volume after compression) is more than 1.0 and 2.5 or less, preferably more than 1.0 and 1.8 or less.
<2-31>
The production method according to any of <2-1> to <2-30>, wherein the temperature in the heating and drying step is, relative to the boiling point (Tb)° C. of the solvent, (Tb+10)° C. or higher, preferably (Tb+20)° C. or higher, and is (Tb+80)° C. or lower, preferably (Tb+50)° C. or lower.
<2-32>
The production method according to any of <2-1> to <2-31>, including a shape working step of shape working including cutting or deforming the fibrous structure, after the heating and drying step.

EXAMPLES

Measurement methods for numerical data in Examples and Comparative Examples are as follows.
(1) Measurement for Requirements (a) and (b)
As a dedicated machine for mercury intrusion technique, used was a mercury intrusion micropore sizer manufactured by Shimadzu Corporation (PoreSizer 9320) for determination of pore size distribution. The mass of the catalyst fibrous structure was previously weighed, and the pore size distribution of the catalyst fiber diameter was determined according to a mercury intrusion technique. For pore size measurement through calculation according to a mercury intrusion technique, used was the following equation.

$$D = -4\gamma \cos\theta / P$$

wherein D represents a micropore diameter [m], γ represents the surface tension of mercury [mN/m], θ represents a contact angle [°], and P represents a pressure [MPa]. The surface tension of mercury was 482.536 mN/m, the contact angle thereof in use was 130°, and the mercury pressure during the measurement was from 0 to 206.85 MPa.

Figure 6:
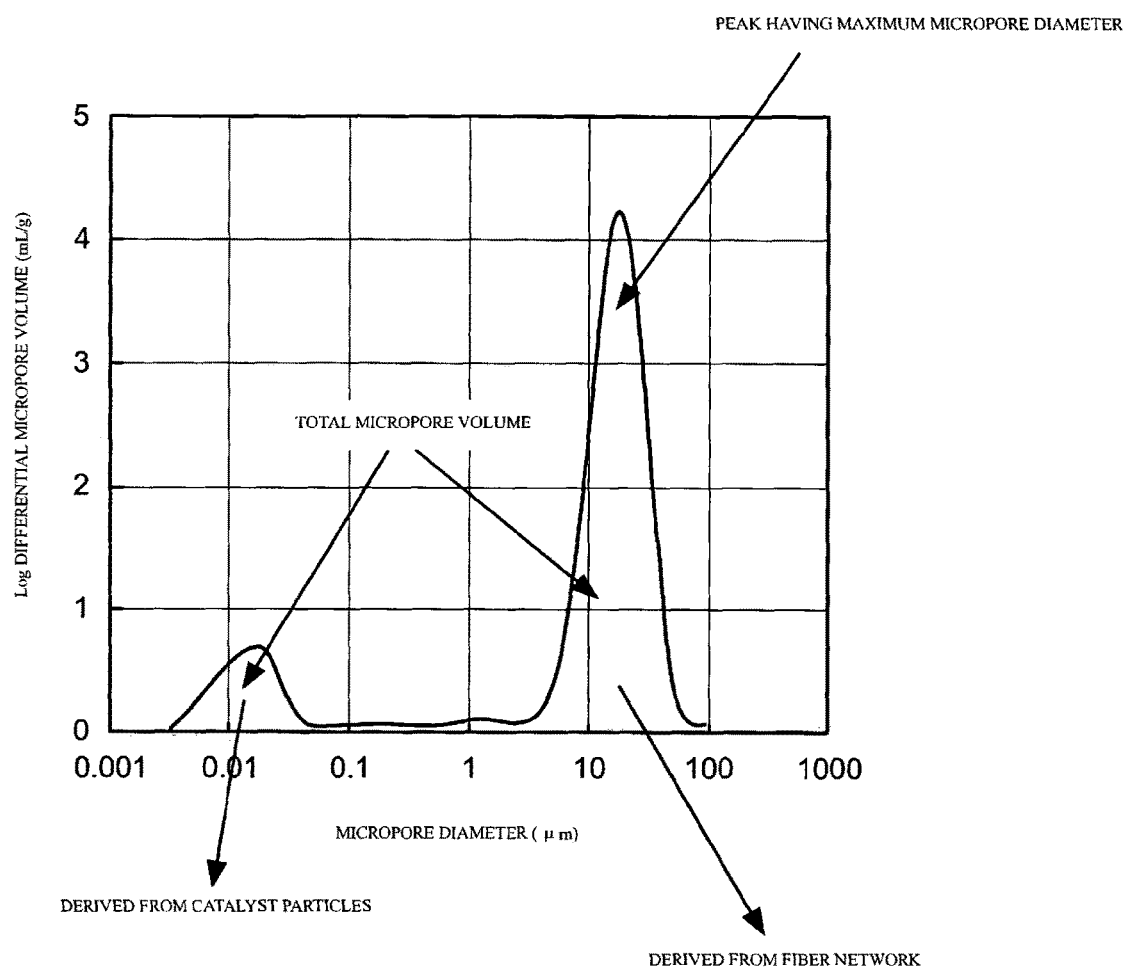
FIG. 6 is a conceptual view of a Log differential micropore volume distribution curve.

Using the above-mentioned measurement machine, the pore size measurement was as follows. The pressure given to mercury was gradually changed within the above-mentioned range, and the volume of mercury having penetrated into the micropores at that time, that is, the micropore volume V was measured, the relationship between the micropore diameter D calculated according to the above-mentioned equation and the micropore volume was drawn, and based on the relational curve, a graph was drawn in which the vertical axis was the Log differential coefficient dV/d(Log D) of the relational curve and the horizontal axis was the micropore diameter D (see FIG. 6). This graph is referred to as a Log differential micropore volume distribution curve. The pore size distribution was measured within a micropore diameter range of from 6 nm to 100000 nm. In the unit of the micropore volume shown in FIG. 6 (mL/g), (mL) indicates the amount of mercury having penetrated into the micropores, and (g) indicates the mass of the catalyst fibrous structure sample used for the measurement.

In the case where the pore size distribution curve of the catalyst fibrous structure analyzed according to the present measurement method has plural peaks, the peak having a maximum micropore diameter is defined as the maximum peak in the Log differential micropore volume distribution curve of (a) (also referred to as "maximum peak micropore diameter"). The value of Log differential coefficient dV/d (Log D) at the maximum peak is defined as the Log differential micropore volume at the maximum peak in (b).

(2) Measurement for Requirements (c)

The amount of the catalyst metal compound and binder carried per unit volume (c) is defined by the following equation.

Amount of carried catalyst metal compound and binder [g/mL]=mass of carried catalyst metal compound and binder [g]/volume of catalyst fibrous structure [mL]

Regarding the above, mass of carried catalyst metal compound and binder [g]=mass of catalyst fibrous structure after calcination [g]−mass of catalyst fibrous structure before carrying step [g], and for example, in the case of a sheet structure, volume of catalyst fibrous structure [mL] =area of catalyst fibrous structure [m²]×thickness of catalyst fibrous structure [m]. The thickness of the catalyst fibrous structure was measured, using a constant-pressure thickness meter (PG-11 manufactured by TECLOCK) under a constant-pressure load of 0.363 N, and a pressure of 0.363 kPa.

Amount of Catalyst Metal Carried Per Unit Mass

The amount of the catalyst metal carried per unit mass of the catalyst fibrous structure [g/g] was quantified using a fluorescent X-ray analyzer "Rigaku ZSX100e" (manufactured by Rigaku Corporation).

Amount of Catalyst Metal Carried Per Unit Volume

The amount of the catalyst metal carried per unit volume of the catalyst fibrous structure was calculated according to the following equation.

Amount of catalyst metal carried per unit volume of catalyst fibrous structure [g/mL]=amount of catalyst metal carried per unit mass [g/g]×bulk density of catalyst [kg/m³]/1000

The bulk density of the catalyst was measured using the mercury intrusion micropore sizer described in the above (1).

<Micropore Volume and Micropore Diameter>

The micropore volume and the micropore diameter in the fibrous structure and the catalyst fibrous structure were measured using the mercury intrusion method as described above, like in the case of measurement for the abovementioned (1) requirements (a) and (b).

<Particle Size Distribution and Viscosity of Coating Material>

For the dispersed particle diameter in the coating material, measured was the median diameter thereof through laser diffractometry using a particle sizer (SALD-300V manufactured by Shimadzu Corporation). The viscosity of the coating material was measured using an E-type viscometer (TVE-25L manufactured by Toki Sangyo Co., Ltd., standard cone rotor), in which the amount of the coating material was 2 mL and the revolution number was 20 rpm, and the value after 1 minute was measured.

<Amount of Carried Catalyst Metal Compound and Binder>

The amount of the carried catalyst metal compound and binder per unit volume of the catalyst fibrous structure is defined by the following equation.

Amount of carried catalyst metal compound and binder [g/mL]=mass of carried catalyst metal compound and binder [g]/volume of catalyst fibrous structure [mL]

Regarding the above, mass of carried catalyst metal compound and binder [g]=mass of catalyst fibrous structure after calcination [g]−mass of fibrous structure before carrying step [g], and for example, in the case of a sheet structure, volume of catalyst fibrous structure [mL]=area of catalyst fibrous structure [m²]×thickness of catalyst fibrous structure [m].

<Thickness of Fibrous Structure and Catalyst Fibrous Structure>

The thickness of the fibrous structure was measured, using a constant-pressure thickness meter (PG-11 manufactured by TECLOCK) under a constant-pressure load of 0.363 N, and a pressure of 0.363 kPa.

<Confirmation of Carried State>

The state as to whether the catalyst metal compound and the binder could be uniformly carried inside the catalyst fibrous structure was confirmed by observing the cross section of the catalyst fibrous structure. Using a cross section forming device (IB-09010CP, manufactured by JEOL Ltd.), the catalyst fibrous structure was cut, and the cross section thereof was observed using a scanning electronic microscope (SE4300, manufactured by Hitachi High-Technologies Corporation).

Production Example 1 (Production of Powdery Catalyst Precursor 1)

800 g of deionized water and 232 g of $Ni(NO_3)_2 \cdot 6H_2O$ were put into a 2-L separable flask, and heated up to 80° C. with stirring. A solution prepared by dissolving 33 g of JIS-3 water glass and 113 g of $Na_2CO_3$ into 630 g of deionized water followed by heating at 80° C. was put all thereinto with stirring. After the addition, 24 g of $Mg(NO_3)_2 \cdot 6H_2O$ was added thereto, the formed slurry was stirred at 80° C. for 1 hour, and the precipitate was filtered out and washed with water, and then dried at 110° C. to give a powdery catalyst precursor 1. The Ni content in the resultant catalyst precursor was 76.1% by mass. In the particle size distribution of the powdery catalyst precursor through laser diffractometry, the median diameter thereof was 171 μm.

Production Example 2 (Production of Catalyst Metal Oxide 2)

A mixed aqueous solution of cobalt nitrate, yttrium nitrate (n-hydrate) and palladium nitrate in an atomic ratio of cobalt/yttrium/palladium of 100:5:0.08, and an aqueous ammonium carbonate solution were stirred and mixed at room temperature. The formed precipitate was fully washed with water, and dried at 110° C. After the drying, an aqueous solution of ammonium molybdate to be in an atomic ratio of molybdenum to cobalt of 1/100 was mixed therein with stirring at room temperature, evaporated to dryness with an evaporator, and then calcined at 600° C. for 4 hours to give a catalyst metal oxide 2 (Co—Y—Pd—Mo oxide). The resultant catalyst metal oxide 2 had an atomic ratio of Co/Y/Pd/Mo=100/3.9/0.08/1.5.

Production Example 3 (Production of Catalyst Metal Oxide 3)

Synthetic zeolite was put into a stainless container, and then a solution prepared by dissolving copper nitrate, nickel nitrate and ruthenium chloride in the water to be in a molar ratio of the metal atoms of Cu:Ni:Ru=4:1:0.01 was added thereto and heated with stirring. At 90° C., an aqueous 10 mass % sodium carbonate solution was gradually and dropwise added thereto with controlling the pH to be from 9 to 10. After ripened for 1 hour, the precipitate was filtered out, washed with water, then dried at 80° C. for 10 hours, and calcined at 600° C. for 3 hours to give a powdery catalyst. The proportion of the metal oxide in the resultant powdery catalyst was 50% by mass, and the proportion of synthetic zeolite therein was 50% by mass.

Example 1-1

According to the flow shown in FIG. 1, a catalyst fibrous structure was produced. As the fibrous structure, used was a sheet formed of alumina-silica fibers and glass fibers (MC Paper, manufactured by Nippon Sheet Glass Co., Ltd., 50 mm×50 mm, thickness 1.0 mm, bulk density 180 kg/m$^3$, micropore diameter 23 μm, micropore volume per unit mass 4.4 mL/g, porosity 920).

<Coating Material Preparation Step>

11.2 g of the powdery catalyst precursor 1 obtained in Production Example 1, 14.0 g of a binder, silica sol (Snowtex (registered trademark) ST-20, manufactured by Nissan Chemical Industries, Ltd., solid content 200), 6.4 g of a solvent, deionized water, and 3.4 g of a dispersant, polycarboxylate polymer surfactant (KAOCER (registered trademark) 2100, manufactured by Kao Corporation) were put into a 50-mL plastic container and sealed up, and premixed by shaking the container from side to side and up and down until the powder masses therein could disappear.

Next, using a thin-film revolution-type high-speed mixer (Filmix 40-40 Model, manufactured by Primix Corporation), the mixture was dispersed for 30 seconds at a peripheral speed of 30 m/s, thereby giving a catalyst precursor coating material, in which the solid content of the catalyst precursor and the binder was 406 by mass. In this, the solid mass ratio of the catalyst precursor and the binder was 80/20. As measured through laser diffractometry, the maximum peak of the particle size distribution of the catalyst precursor coating material was 500 nm.

<Carrying Step>

The catalyst precursor coating material having a solid content of 40% by mass, as obtained in the coating material preparation step, was diluted with deionized water to have a solid content of 206 by mass, and a petri dish (φ 86 mm, height 14 mm) was filled therewith. The fibrous structure was immersed therein for 150 seconds, and then turned upside down in order that the structure could more uniformly carry the coating material and could evade any biased carrying of the material, and further this was immersed for 150 seconds, that is, for 300 seconds in total.

<Excess Coating Material Removing Step>

The fibrous structure 13 impregnated with the catalyst precursor coating material was put on a polytetrafluoroethylene (PTFE)-coated stainless plate (230 mm×230 mm, thickness 1.5 mm, 686 g), and while the remover 7 (stainless plate, thickness 0.5 mm, width 75 mm) was kept attached vertically to the surface of the fibrous structure 13, the remover was moved only once from one end to the other end of the structure by the pressure of the mass of the remover 7, 34 kPa, to thereby remove the excess catalyst precursor coating material adhering to the surface of the fibrous structure, and further, the fibrous structure 13 was turned upside down and the same operation was repeated, thereby providing the fibrous structure 23.

<Drying Step>

The fibrous structure 23 was dried on the above-mentioned PTFE-coated stainless plate, at 120° C. for 60 minutes.

<Shape Working Step>

Next, using a Thomson blade, the fibrous structure (50 mm×50 mm×1.0 mm) was cut so that the range of 40 mm×40 mm thereof could be divided into 16 sections each in a size of 20 mm×5 mm.

<Calcination Step>

This was calcined in an air atmosphere at 400° C. for 5 hours to give a catalyst fibrous structure.

Example 1-2

This was carried out in the same manner as in Example 1-1, except that, in the carrying step, the catalyst precursor coating material was diluted to have a solid content of 30% by mass.

Example 1-3

This was carried out in the same manner as in Example 1-1, except that, in the carrying step, the catalyst precursor coating material was not diluted to reduce the solid content thereof, and the catalyst precursor coating material was used as it was.

Example 1-4

This was carried out in the same manner as in Example 1-3, except that, in the coating material preparation step, the powdery catalyst precursor was 13.3 g, the binder was 16.6 g, deionized water as the solvent was 1.1 g, and the dispersant was 4.0 g, and the solid content of the catalyst precursor coating material was 48% by mass.

Example 1-5

This was carried out in the same manner as in Example 1-3, except that, in the coating material preparation step, the powdery catalyst precursor was 12.0 g, the binder was 9.8 g, the solvent was 9.5 g, and the polymer surfactant was 3.6 g, and the solid content mass ratio of the catalyst and the binder was 86/14.

Example 1-6

This was carried out in the same manner as in Example 1-1, except that, as the fibrous structure, used was a sheet formed of alumina-silica fibers (Isowool (registered trademark) 1260 Ace Paper, manufactured by Isolite Insulating Products Co., Ltd., 50 mm×50 mm, thickness 2.5 mm, bulk density 160 kg/m$^3$).

Example 1-7

This was carried out in the same manner as in Example 1-3, except that, in the coating material preparation step, the powdery catalyst precursor 1 was 10.5 g, silica sol (Snowtex (registered trademark) ST-20, manufactured by Nissan Chemical Industries, Ltd., solid content 20%) as the binder was 13.1 g, deionized water as the solvent was 8.2 g, and polymer surfactant (KAOCER (registered trademark) 2100, manufactured by Kao Corporation) as the dispersant was 3.2 g, and that the excess coating material removing step was omitted.

Example 1-8

This was carried out in the same manner as in Example 1-3, except that, in the drying step, the surface and the back of the fibrous structure were constrained each by the above-mentioned PTFE-coated stainless plate, and hot-pressed therebetween under a pressure of 0.5 MPa at 120° C. for 5 minutes (using LaboPress P2-30T, manufactured by Toyo Seiki Co., Ltd.) for volume control to a compression ratio (thickness before compression/thickness after compression) of 1.3.

Example 1-9

This was carried out in the same manner as in Example 1-1, except that, as the fibrous structure, used was a sheet formed of calcia-magnesia-silica fibers (Super Wool 607, manufactured by Shin-Nippon Thermal Ceramics Corporation, 50 mm×50 mm, thickness 1.0 mm, bulk density 210 kg/m$^3$, micropore diameter 58 μm, micropore volume per unit mass 3.6 mL/g, porosity 72%), and the coating material was diluted to have a solid content of 10% by mass.

Example 1-10

This was carried out in the same manner as in Example 1-8, except that the thickness of the fibrous structure was 3.0 mm and the compression ratio was 2.0.

Example 1-11

This was carried out in the same manner as in Example 1-1, except that, in the carrying step, the catalyst precursor coating material was diluted to have a solid content of 10% by mass.

Experimental Example 1

The catalyst fibrous structure obtained in each of Examples 1-1 to 1-6, and 1-8 to 1-11 was activated in the manner mentioned below, and used for decomposition of sulfur compounds in fat to thereby evaluate the performance of the catalyst fibrous structure.

<Vapor-Phase Reduction>

Using an atmospheric furnace (MBA-2040D-SP, manufactured by Motoyama Co., Ltd.), the catalyst fibrous structure was treated in a 4% hydrogen atmosphere at 450° C. for 5 hours and then treated in a 1% oxygen atmosphere at 25° C. for 8 hours for vapor-phase reduction.

<Liquid-Phase Reduction>

The catalyst fibrous structure was charged in a 500-mL autoclave in such a manner that 0.3 g of Ni metal was present in the catalyst fibrous structure, and in 200 g of 1-dodecanol, this was processed for liquid-phase reduction in a 1.0 MPa hydrogen atmosphere at 200° C., at an autoclave stirring number of 900 rpm for 2 hours.

<Decomposition Reaction>

Figure 9:
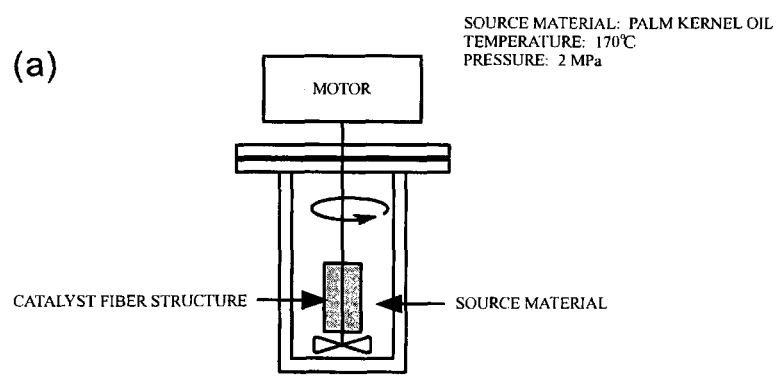
FIG. 9 shows, in both (a) and (b), views each showing a measurement apparatus and measurement conditions used in sulfur decomposition reaction in Examples and Comparative Examples.
Figure 9:
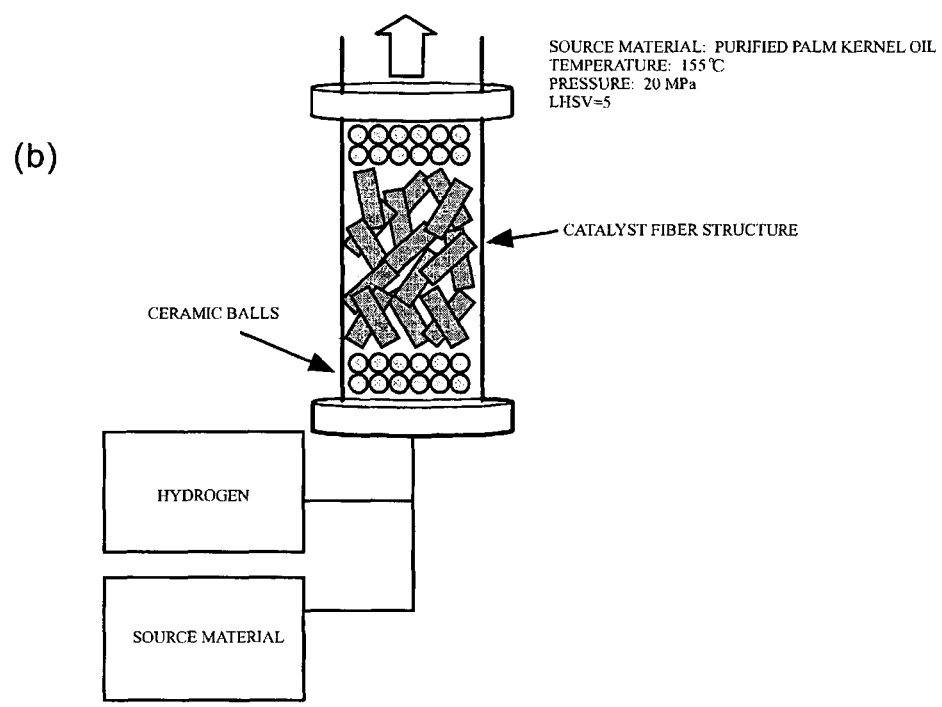

In a 500-mL autoclave, the catalyst fibrous structure was charged so that the Ni metal was present in an amount of 0.3 g; a crude oil of palm kernel oil was used as a source material; and a reaction was caused at 170°, at 2.0 MPa and at a hydrogen flow rate of 5 NL/min for 4 hours. A reaction device and reaction conditions employed herein are shown in FIG. 9(a). In every Example, the material was reacted for the same period of time, and the sulfur compound concentration at the end of the reaction (end-point sulfur compound concentration) was determined for evaluation. The source material used had a sulfur compound concentration of 3.5 ppm.

The sulfur compound amount (end-point sulfur compound concentration) in the reaction product was measured, using a low-concentration sulfur analyzer (product name; 9000LLS, manufactured by AnTek Products Corporation) at a calcination temperature of 1050° C. and at a voltage of the UV detector of 840 V.

Example 1-12

A catalyst fibrous structure was obtained in the same manner as in Example 1-7, except that 5.6 g of the powdery catalyst metal oxide 2 obtained in Production Example 2, 4.7 g of zirconia sol (ZR-30BS, manufactured by Nissan Chemical Industries, Ltd., solid content 30%) as a binder, and 24.7 g of the solvent were used, and the calcination temperature was 600° C.

Experimental Example 2

The catalyst fibrous structure of Example 1-12 was activated in the manner mentioned below, and a decomposition reaction of sulfur compounds in fatty acid was caused.

<Vapor-Phase Reduction>

Using an atmospheric furnace (MBA-2040D-SP, manufactured by Motoyama Co., Ltd.), the catalyst fibrous structure was treated in a 4% hydrogen atmosphere at 600° C. for 5 hours and then treated in a 1% oxygen atmosphere at 25° C. for 8 hours for vapor-phase reduction.

<Decomposition Reaction>

In a 500-mL autoclave, the catalyst fibrous structure was charged so that 0.9 g of Co metal was present; a mixed fatty acid having a C8-18 alkyl chain length was used as a binder; and a reaction was caused at 230° C. at 24.5 MPa and at a hydrogen flow rate of 5 NL/min for 4 hours. The sulfur compound concentration (end-point sulfur compound concentration) at the end of the reaction was determined for evaluation. The sulfur compound concentration in the source material used is 0.8 ppm. The reaction device used here is the same as that of FIG. 9(a).

Example 1-13

A catalyst fibrous structure was obtained in the same manner as in Example 1-7, except that 8.4 g of the powdery catalyst precursor, 10.5 g of the binder, 13.6 g of the solvent, and 2.5 g of the polymer surfactant were used.

Experimental Example 3

The catalyst fibrous structure obtained in Examples 1-7 and 13 was activated in the manner mentioned below, and used for decomposition of sulfur compounds in a methyl ester.
<Vapor-Phase Reduction>
Using an atmospheric furnace (MBA-2040D-SP, manufactured by Motoyama Co., Ltd.), the catalyst fibrous structure was treated in a 4% hydrogen atmosphere at 450° C. for 5 hours and then treated in a 1% oxygen atmosphere at 25° C. for 8 hours for vapor-phase reduction.
<Liquid-Phase Reduction>
The catalyst fibrous structure was charged in a 500-mL autoclave in such a manner that 0.3 g of Ni metal was present, and in 200 g of a palm kernel oil-derived fatty acid methyl ester (distilled product), this was processed for liquid-phase reduction in a 1.0 MPa hydrogen atmosphere at 200° C., at an autoclave stirring number of 900 rpm for 2 hours.
<Decomposition Reaction>
In a 500-mL autoclave, the catalyst fibrous structure was charged so that the Ni metal amount therein could be 0.3 g. As the source material, used were a distilled product of a palm kernel oil-derived fatty acid methyl ester and a distilled pitch of a palm kernel oil-derived fatty acid methyl ester. The material was processed at 135° C., at 24.50 MPa, and at a hydrogen flow rate of 5 NL/min, for 4 hours. The sulfur compound concentration (end-point sulfur compound concentration) at the end of the reaction was determined for evaluation. The sulfur compound concentration in the source material used is 2.3 ppm. The reaction device used here is the same as that of FIG. 9(a).

Example 1-14

36 g of the powdery catalyst precursor 1 obtained in Production Example 1, 45 g of a binder, silica sol (Snowtex ST-20 (Snowtex (registered trademark) ST-20, manufactured by Nissan Chemical Industries, Ltd., solid content: 20% by mass), 58.5 g of a solvent, deionized water, and 10.5 g of isopropyl alcohol were put into a 250-mL plastic container and sealed up, and using a testing disperser (manufactured by Toyo Seiki Co., Ltd., according to JIS K5101-1-2), and using 160 g of titania beads having a diameter of 0.8 mm as a dispersion medium, this was treated for 30 minutes to prepare a catalyst coating material containing the powdery catalyst and having a solid content of 30% by mass. The solid content mass ratio of the catalyst powder and the binder was 80/20. The catalyst coating material was analyzed through laser diffractometry, and the particle size distribution thereof had a maximum peak at 1 µm.

A petri dish (φ 86 mm, height 14 mm) was filled with the catalyst coating material having a solid content of 30% by mass, as obtained in the coating material preparation step, and a sheet formed of calcia-magnesia-silica fibers (Super Wool 607, manufactured by Shin-Nippon Thermal Ceramics Co., Ltd., 10 mm×2.5 mm, thickness 1.0 mm, bulk density 210 kg/m$^3$, micropore diameter 58 µm, micropore volume per unit mass 3.6 mL/g, porosity 72%) was immersed therein for 150 seconds. Then, the sheet was turned upside down, and further immersed therein for 150 seconds, that is, for 300 seconds in total. Subsequently, this was calcined in an air atmosphere under an atmospheric pressure at 400° C. for 2 hours to give a catalyst fibrous structure.

Example 1-15

This was carried out in the same manner as in Example 1-1, except that the coating material preparation step was carried out in the manner mentioned below and the excess coating material removing step was omitted.
<Coating Material Preparation Step>
48 g of a copper oxide-containing powdery catalyst (KC-1H, manufactured by Sakai Chemical Industry Co., Ltd.), 33 g of a binder, silica sol Snowtex ST-CM (Snowtex (registered trademark) ST-CM, manufactured by Nissan Chemical Industries, Ltd., solid content: 30% by mass), 212 g of a solvent, deionized water, and 450 g of a dispersion medium, zirconia beads having a diameter of 2.0 mm were put into a 500-mL plastic container and sealed up, and using a ball mill (ANZ-51S, manufactured by Nitto Kagaku Co., Ltd.), this was treated for 24 hours at a rotation number of 120 rpm to prepare a catalyst coating material containing the powdery catalyst and having a solid content of 30% by mass. The solid content mass ratio of the catalyst powder and the binder was 80/20. The catalyst coating material was analyzed through laser diffractometry, and the particle size distribution thereof had a maximum peak at 1.7 µm.

Experimental Example 4

The performance of the catalyst fibrous structure obtained in Example 1-15 was evaluated by dehydrogenation of alcohol.
<Liquid-Phase Reduction>
The catalyst fibrous structure was charged in a 1000-mL separable flask in such a manner that 0.025 g of Cu metal was present in the catalyst fibrous structure, and in 250 g of 1-dodecanol, this was subjected to liquid-phase reduction treatment in a hydrogen atmosphere at 220° C. and at a stirring number of 200 rpm for 2 hours.
<Dehydrogenation Reaction>
The catalyst fibrous structure was charged in a 1000-mL separable flask in such a manner that 0.025 g of Cu metal was present in the catalyst fibrous structure, and in 250 g of 1-dodecanol, this was subjected to dehydrogenation in a nitrogen atmosphere at 220° C. and at a stirring number of 200 rpm. In 60 minutes after the start of the reaction, the dodecyl aldehyde production rate was determined for catalyst performance evaluation.

Example 1-16

70 g of the powdery catalyst metal oxide 3 obtained in Production Example 3, 40.2 g of a binder, phenolic resin (PR-9480 manufactured by Sumitomo Bakelite Co., Ltd., nonvolatile content 58% by mass), and 123.1 g of a solvent, 2-butanone were put into a 250-mL plastic container and sealed up, and using a testing disperser (manufactured by Toyo Seiki Co., Ltd., according to JIS K5101-1-2), and using 250 g of zirconia beads having a diameter of 1.0 mm as a dispersion medium, this was treated for 60 minutes to prepare a catalyst coating material containing the powdery catalyst and having a solid content of 40% by mass. The solid content mass ratio of the catalyst powder and the binder was 80/20. The catalyst coating material was analyzed through laser diffractometry, and the particle size distribution thereof had a maximum peak at 1.6 µm.

A petri dish (φ 86 mm, height 14 mm) was filled with the catalyst coating material having a solid content of 40% by mass, as obtained in the coating material preparation step, and a sheet formed of alumina-silica fibers and glass fibers (MC Paper, manufactured by Nippon Sheet Glass Co., Ltd., 50 mm×50 mm, thickness 1.0 mm, bulk density 180 kg/m³, micropore diameter 23 μm, micropore volume per unit mass 4.4 mL/g, porosity 92%) was immersed therein for 150 seconds. Then, the sheet was turned upside down, and further immersed therein for 150 seconds, that is, for 300 seconds in total. Subsequently, this was calcined in an air atmosphere under an atmospheric pressure at 290° C. for 90 minutes to give a catalyst fibrous structure.

Experimental Example 5

The performance of the catalyst fibrous structure obtained in Example 1-16 was evaluated by amination of alcohol.
<Amination Reaction>
The catalyst fibrous structure was charged in a 2000-mL separable flask in such a manner that 11.6 g of powdery catalyst present in the catalyst fibrous structure, then 917 g of 1-dodecanol was added thereto, and adding dimethylamine thereto was started with hydrogen gas supplied, while the temperature was kept constant at 220° C. Samples were collected with time and analyzed through gas chromatography. In a reaction time of 120 minutes, the production rate of N,N-dimethyldodecylamine was determined for catalyst performance evaluation.

Comparative Example 1-1

A binder, alumina was added to the catalyst precursor 1 obtained in Production Example 1 in an amount of 3% by mass, and formed into a noodle-like structure. This was used in place of the catalyst fibrous structure, and evaluated in the same manner as in Experimental Example 1.

Comparative Example 1-2

This was evaluated in the same manner as in Experimental Example 4, except that 0.07 g of a copper oxide-containing pellet-like catalyst (ST-301H-33, manufactured by Sakai Chemical Industry Co., Ltd.) was used.

Comparative Example 1-3

A binder, silica was added to the catalyst metal oxide 3 obtained in Production Example 3 in an amount of 3% by mass, and formed into a pellet-like structure. This was used in place of the catalyst fibrous structure, and evaluated in the same manner as in Experimental Example 5.
<Filling Ability and Performance in Reactor>
The filling ability and the performance in a reactor were evaluated according to a continuous fixed-bed process.

Experimental Example 6

The catalyst fibrous structure obtained in Example 1-14 was charged in a reactor tube having an inner diameter of 13 mm in such a manner that the apparent volume in the charged part became 12 mL, and according to a continuous fixed-bed process, a test of desulfurization of a fatty acid ester (sulfur concentration=2.6 mg/g) was carried out. As the source material, used was purified palm kernel oil. The reaction condition was 20 MPa, and 155° C. The material flow rate was 54 g/h (liquid hourly space velocity LHSV=5 (l/h)), and the hydrogen flow rate was 132 NL/h. At the end of the reaction, the sulfur compound concentration (end-point sulfur compound concentration) was determined for catalyst performance evaluation. The desulfurization activity per mass of the active catalyst metal was defined as follows.

Desulfurization activity=Log {(sulfur concentration before adsorptive desulfurization treatment)/ (sulfur concentration after adsorptive desulfurization treatment)}/(mass of charged Ni/apparent volume in charged part), wherein "Log" represents a natural logarithm.

The reaction device and the reaction condition used here are shown in FIG. 9(b).

Experimental Example 7

This was carried out in the same manner as in Experimental Example 6, except that the pellet-like catalyst structure obtained in Comparative Example 1-1 was used.

Table 1 shows the configurations of the catalyst fibrous structures in Examples and Comparative Examples, along with the presence or absence of the excess coating material removing step and the volume controlling step therein. Table 2 shows the requirements (a) to (c) in the catalyst fibrous structures obtained in Examples 1-1 to 1-14 and Comparative Example 1-1, and the end-point sulfur compound concentration therein. Table 2 also shows the requirements (a) to (c) in the catalyst fibrous structures obtained in Example 1-15 and Comparative Example 1-2, and the aldehyde production rate in 60 minutes therein, as well as the requirements (a) to (c) in the catalyst fibrous structures obtained in Example 1-16 and Comparative Example 1-3, and the N,N-dimethyldodecylamine production rate in 120 minutes therein.

The evaluation results of desulfurization activity in the continuous fixed-bed reaction device in Example 1-14 and Comparative Example 1-1, according to Experimental Examples 6 and 7, are shown in Table 3. Also in fixed-bed reaction, Examples of the present invention realized improved desulfurization activity per mass of the active catalyst metal in the catalyst adsorbent, as compared with. Comparative Examples. Not limited thereto, Examples of the present invention realized improved activity retentivity.

TABLE 1

| | | Catalyst Metal Compound or Catalyst Precursor Coating Material | | | Production Step | |
| --- | --- | --- | --- | --- | --- | --- |
| | | Catalyst Metal Compound or Catalyst Precursor/Binder ratio by mass | Solid Content in Coating Material % by mass | Fibrous structure | Excess Coating Material Removing Step | Volume Controlling Step |
| Example 1-1 | Catalyst fibrous structure | 80/20 | 20 | sheet of alumina-silica fibers and glass fibers (MC Paper) | yes | no |

TABLE 1-continued

| | | Catalyst Metal Compound or Catalyst Precursor Coating Material | | | Production Step | |
|---|---|---|---|---|---|---|
| | | Catalyst Metal Compound or Catalyst Precursor/Binder ratio by mass | Solid Content in Coating Material % by mass | Fibrous structure | Excess Coating Material Removing Step | Volume Controlling Step |
| Example 1-2 | Catalyst fibrous structure | 80/20 | 30 | sheet of alumina-silica fibers and glass fibers (MC Paper) | yes | no |
| Example 1-3 | Catalyst fibrous structure | 80/20 | 40 | sheet of alumina-silica fibers and glass fibers (MC Paper) | yes | no |
| Example 1-4 | Catalyst fibrous structure | 80/20 | 48 | sheet of alumina-silica fibers and glass fibers (MC Paper) | yes | no |
| Example 1-5 | Catalyst fibrous structure | 86/14 | 40 | sheet of alumina-silica fibers and glass fibers (MC Paper) | yes | no |
| Example 1-6 | Catalyst fibrous structure | 80/20 | 20 | alumina-silica fiber sheet (1260 Ace Paper) | yes | no |
| Example 1-7 | Catalyst fibrous structure | 80/20 | 38 | sheet of alumina-silica fibers and glass fibers (MC Paper) | no | no |
| Example 1-8 | Catalyst fibrous structure | 80/20 | 40 | sheet of alumina-silica fibers and glass fibers (MC Paper) | yes | yes compression ratio 1.3 |
| Example 1-9 | Catalyst fibrous structure | 80/20 | 10 | calcia-magnesia-silica fiber sheet (Super Wool) | yes | no |
| Example 1-10 | Catalyst fibrous structure | 80/20 | 40 | sheet of alumina-silica fibers and glass fibers (MC Paper) | yes | yes compression ratio 2.0 |
| Example 1-11 | Catalyst fibrous structure | 80/20 | 10 | sheet of alumina-silica fibers and glass fibers (MC Paper) | yes | no |
| Example 1-12 | Catalyst fibrous structure | 80/20 | 20 | sheet of alumina-silica fibers and glass fibers (MC Paper) | no | no |
| Example 1-13 | Catalyst fibrous structure | 80/20 | 30 | sheet of alumina-silica fibers and glass fibers (MC Paper) | no | no |
| Example 1-14 | Catalyst fibrous structure | 80/20 | 30 | calcia-magnesia-silica fiber sheet (Super Wool) | no | no |
| Example 1-15 | Catalyst fibrous structure | 80/20 | 20 | sheet of alumina-silica fibers and glass fibers (MC Paper) | no | no |
| Example 1-16 | Catalyst fibrous structure | 80/20 | 40 | sheet of alumina-silica fibers and glass fibers (MC Paper) | no | no |
| Comparative Example 1-1 | Noodle-like Structure | 97/3 | — | — | — | — |
| Comparative Example 1-2 | Pellet-like Structure | 100/0 | — | — | — | — |
| Comparative Example 1-3 | Pellet-like Structure | 97/3 | — | — | — | — |

TABLE 2

| | Requirements for Catalyst fibrous structure | | | | | | |
|---|---|---|---|---|---|---|---|
| | (a) maximum peak in Log differential micropore volume distribution curve (μm) | (b) Log differential micropore volume at maximum peak (mL/g) | (c) amount of carried catalyst metal compound and binder per unit volume (g/mL) | amount of carried catalyst metal per unit mass (g/g) | bulk density of catalyst (kg/m$^3$) | amount of carried catalyst metal per unit volume (g/mL) | end-point sulfur compound concentration (ppm) |
| Example 1-1 | 21.4 | 5.5 | 0.16 | 0.21 | 337 | 0.071 | 0.2 |
| Example 1-2 | 23.5 | 3.3 | 0.26 | 0.28 | 462 | 0.129 | 0.3 |
| Example 1-3 | 21.4 | 0.7 | 0.45 | 0.32 | 735 | 0.235 | 0.5 |
| Example 1-4 | 21.4 | 1.4 | 0.63 | 0.31 | 709 | 0.220 | 0.3 |
| Example 1-5 | 22.1 | 1.3 | 0.47 | 0.33 | 680 | 0.224 | 0.4 |
| Example 1-6 | 33.2 | 2.6 | 0.18 | 0.25 | 1302 | 0.326 | 0.3 |
| Example 1-7 | 22.1 | 1.9 | 0.34 | 0.29 | 953 | 0.276 | 0.3 |
| Example 1-8 | 16.9 | 1.5 | 0.53 | 0.27 | 680 | 0.184 | 0.2 |
| Example 1-9 | 38.0 | 2.5 | 0.07 | 0.15 | 380 | 0.057 | 0.3 |
| Example 1-10 | 8.9 | 0.6 | 0.70 | 0.28 | 1002 | 0.281 | 0.9 |
| Example 1-11 | 20.3 | 7.8 | 0.07 | 0.13 | 227 | 0.030 | 0.3 |
| Example 1-12 | 23.6 | 5.6 | 0.16 | 0.27 | 437 | 0.118 | 0.0 |
| Example 1-13 | 24.3 | 2.6 | 0.16 | 0.22 | 674 | 0.148 | 0.3 |
| Example 1-14 | 60.7 | 4.1 | 0.39 | 0.25 | 764 | 0.191 | 0.4 |

TABLE 2-continued

| | Requirements for Catalyst fibrous structure | | | | | | |
|---|---|---|---|---|---|---|---|
| | (a) maximum peak in Log differential micropore volume distribution curve (μm) | (b) Log differential micropore volume at maximum peak (mL/g) | (c) amount of carried catalyst metal compound and binder per unit volume (g/mL) | amount of carried catalyst metal per unit mass (g/g) | bulk density of catalyst (kg/m³) | amount of carried catalyst metal per unit volume (g/mL) | end-point sulfur compound concentration (ppm) |
| Comparative Example 1-1 | 0.04 | 0.6 | 1.32 | 0.53 | 1317 | 0.698 | 1.1 |
| Example 1-15 | 24.2 | 2.8 | 0.22 | 0.15 | 482 | 0.072 | 1.16* |
| Comparative Example 1-2 | 0.01 | 0.6 | 1.78 | 0.36 | 1910 | 0.688 | 0.38* |
| Example 1-16 | 25.9 | 1.4 | 0.42 | 0.38 | 964 | 0.366 | 15.56** |
| Comparative Example 1-3 | 0.026 | 0.15 | 2.06 | 0.47 | 2202 | 1.035 | 5.69** |

*In Example 1-15 and Comparative Example 2, aldehyde production rate (%) in 60 minutes.
**In Example 1-16 and Comparative Example 3, N,N-dimethyldodecylamine production rate (%) in 120 minutes.

TABLE 3

| | Requirements for Catalyst fibrous structure | | | | | |
|---|---|---|---|---|---|---|
| | (a) maximum peak in Log differential micropore volume distribution curve (μm) | (b) Log differential micropore volume at maximum peak (mL/g) | (c) amount of carried catalyst metal compound and binder per unit volume (g/mL) | Desulfurization Activity per Ni Unit Weight (initial activity) [—] | Desulfurization Activity per Ni Unit Weight, after liquid passing at 1500 g-source material/g-Ni [—] | Desulfurization Activity Retentivity, after liquid passing at 1500 g-source material/g-Ni [%] |
| Example 1-14 | 60.7 | 4.1 | 0.39 | 32.3 | 22.4 | 69.3 |
| Comparative Example 1-1 | 0.04 | 0.6 | 1.32 | 7.93 | 3.05 | 38.5 |

From Table 1 to Table 3, Examples 1-1 to 1-16 satisfying the requirements in the present invention realize good contact with the reactant and realize good reactivity. On the other hand, Comparative Examples 1-1 to 1-3 do not have micropores satisfying the requirements in the present invention, and therefore have poor reactivity and could not enhance catalyst performance per reactor.

From the above, the catalyst fibrous structure satisfying the requirements in the present invention realizes good contact with a reactant and realizes good reactivity, and makes it possible to fill a reactor with a larger amount of catalyst per the volume of reactor, therefore enhancing the catalyst performance per reactor.

Example 2-1

According to the flow shown in FIG. 1, a catalyst fibrous structure was produced. As the fibrous structure, used was a sheet formed of alumina-silica fibers and glass fibers (MC Paper, manufactured by Nippon Sheet Glass Co., Ltd., 50 mm×50 mm, thickness 1.0 mm, bulk density 180 kg/m³, micropore diameter at maximum peak 23 μm, micropore volume per unit mass 4.4 mL/g, porosity 92%). However, the excess coating material removing step and the micropore volume controlling step were omitted.

<Coating Material Preparation Step>

10.5 g of the powdery catalyst precursor 1 obtained in Production Example 1, 13.1 g of a binder, silica sol (Snowtex (registered trademark) ST-20, manufactured by Nissan Chemical Industries, Ltd., solid content 20% by mass), 8.2 g of a solvent, deionized water, and 3.2 g of a dispersant, polycarboxylate polymer surfactant (KAOCER (registered trademark) 2100, manufactured by Kao Corporation) were put into a 50-mL plastic container and sealed up, and premixed by shaking the container from side to side and up and down until the powder masses therein could disappear.

Next, using a thin-film revolution-type high-speed mixer (Filmix 40-40 Model, manufactured by Primix Corporation), the mixture was dispersed for 30 seconds at a peripheral speed of 30 m/s, thereby giving a catalyst precursor coating material, in which the solid content of the catalyst precursor and the binder was 38% by mass. In this, the solid mass ratio of the catalyst precursor and the binder was 80/20, and the polymer surfactant was 12% by mass relative to the mass of the catalyst precursor. As measured through laser diffractometry, the dispersed particle diameter in the catalyst precursor coating material was 800 nm, and the viscosity of the coating material was 130 maP·s.

<Carrying Step>

A petri dish (φ 86 mm, height 14 mm) was filled with the catalyst precursor coating material having a solid content of 38% by mass, as obtained in the coating material preparation step, and the fibrous structure was immersed therein for 150 seconds, and then turned upside down in order that the structure could more uniformly carry the coating material and could evade any biased carrying of the material, and further this was immersed for 150 seconds, that is, for 300 seconds in total.

<Drying Step>

The fibrous structure was dried on a polytetrafluoroethylene (PTFE)-coated stainless plate, at 120° C. for 60 minutes.

<Shape Working Step>

Next, using a Thomson blade, the fibrous structure (50 mm×50 mm×1.0 mm) was cut so that the range of 40 mm×40 mm thereof could be divided into 16 sections each in a size of 20 mm×5 mm.

<Calcination Step>

This was calcined in an air atmosphere at 400° C. for 5 hours to give a catalyst fibrous structure.

Example 2-2

<Coating Material Preparation Step>

This was carried out in the same manner as in Example 2-1, except that, as the catalyst source material formulation, 11.2 g of the powdery catalyst precursor 1 obtained in Production Example 1, 14.0 g of the binder, silica sol (Snowtex (registered trademark) ST-20, manufactured by Nissan Chemical Industries, Ltd., solid content 20% by mass), 6.4 g of the solvent, deionized water, and 3.4 g of the dispersant, polymer surfactant (KAOCER (registered trademark) 2100, manufactured by Kao Corporation) were mixed to prepare a coating material having a solid content of 40% by mass, and the excess coating material removing step was not omitted. The dispersed particle diameter in the coating material and the coating material viscosity are as shown in Table 4.

<Excess Catalyst Coating Material Removing Step>

As exemplarily shown in FIG. 5, the fibrous structure 13 impregnated with the catalyst precursor coating material 1 was put on a polytetrafluoroethylene (PTFE)-coated stainless plate (230 mm×230 mm, thickness 1.5 mm, 686 g), and while the remover 7 (stainless plate, thickness 0.5 mm, width 75 mm) was kept attached vertically to the surface of the fibrous structure 13, the remover was moved only once from one end to the other end of the structure by the pressure of the mass of the remover 7, 34 kPa, to thereby remove the excess coating material adhering to the surface of the fibrous structure, and further, the fibrous structure 13 was turned upside down and the same operation was repeated, thereby providing the fibrous structure 23.

Example 2-3

This was carried out in the same manner as in Example 2-2, except that the catalyst precursor coating material having a solid content of 40% by mass, as obtained in the coating material preparation step, was diluted with deionized water to have a solid content of 30% by mass in the carrying step. The dispersed particle diameter in the coating material and the coating material viscosity are as shown in Table 4.

Example 2-4

This was carried out in the same manner as in Example 2-2, except that the catalyst precursor coating material having a solid content of 40% by mass, as obtained in the coating material preparation step, was diluted with deionized water to have a solid content of 20% by mass in the carrying step. The dispersed particle diameter in the coating material and the coating material viscosity are as shown in Table 4.

Example 2-5

This was carried out in the same manner as in Example 2-2, except that the catalyst precursor coating material having a solid content of 40% by mass, as obtained in the coating material preparation step, was diluted with deionized water to have a solid content of 10% by mass in the carrying step. The dispersed particle diameter in the coating material and the coating material viscosity are as shown in Table 4.

Example 2-6

This was carried out in the same manner as in Example 2-4, except that, as the fibrous structure, used was a sheet formed of alumina-silica fibers (Isowool (registered trademark) 1260 Ace Paper, manufactured by Isolite Insulating Products Co., Ltd., 50 mm×50 mm, thickness 2.5 mm, bulk density 160 kg/m$^3$, micropore diameter at the maximum peak 38 μm, micropore volume per unit mass 4.1 mL/g, porosity 87%). The dispersed particle diameter in the coating material and the coating material viscosity are as shown in Table 4.

Example 2-7

A catalyst fibrous structure was obtained in the same manner as in Example 2-1, except that 5.6 g of the powdery catalyst metal oxide 2 obtained in Production Example 2, 4.7 g of a binder, zirconia sol (ZR-30BS, manufactured by Nissan Chemical Industries, Ltd., solid content 30% by mass), and 24.7 g of deionized water were used to control the solid content to be 20% by mass, and the calcination temperature was 500° C. In the particle size distribution as measured through laser diffractometry, the maximum peak was 900 nm. The viscosity was 102 mPa·s. The dispersed particle diameter in the coating material and the coating material viscosity are as shown in Table 4.

Example 2-8

This was carried out in the same manner as in Example 2-2, except that, in the coating material preparation step, the components were mixed and ground into particles in the same manner as in Example 2-2, then deionized water was added thereto to make the solid content 35% by mass, and using a bead disperser (Ultra-Apex Mill manufactured by Kotobuki Industry Co., Ltd.) and using 388 g of zirconia beads having a diameter of 0.1 mm, the coating material was supplied to the disperser at a flow rate of 100 mL/min and at a processing frequency of 60 Hz to give a catalyst metal oxide coating material having a solid content of 35% by mass and a particle diameter of 600 nm, and that, as the fiber sheet, used was a sheet formed of calcia-magnesia-silica fibers (Super Wool 607, manufactured by Shin-Nippon Thermal Ceramics Co., Ltd., 20 mm×5 mm, thickness 1.0 mm, bulk density 210 kg/m$^3$, micropore diameter at the maximum peak 58 μm, micropore volume per unit mass 3.6 mL/g, porosity 72%). The dispersed particle diameter in the coating material and the coating material viscosity are as shown in Table 4.

Example 2-9

This was carried out in the same manner as in Example 2-2, except that, in the coating material preparation step, the powdery catalyst precursor 1 was 12.0 g, the binder was 9.8 g, the solvent was 9.5 g, the polymer surfactant was 3.6 g, and the solid mass ratio of the catalyst precursor and the binder was 86/14. The dispersed particle diameter in the coating material and the coating material viscosity are as shown in Table 4.

Example 2-10

In the carrying step, impregnation of the catalyst precursor coating material was conducted between two stainless rolls 4' and 5' having a diameter of 150 mm×300 mm as shown in FIG. 4, in which the two rolls were arranged so as to have a roll gap at the neighboring region of 0.95 mm and they were rotated at a frequency of 10 Hz so that their rotation directions at the neighboring region were in the vertical downward direction. As the fiber sheet, the sheet 3 formed of alumina-silica fibers and glass fibers (MC Paper, manufactured by Nippon Sheet Glass Co., Ltd., width 50 mm, thickness 1.0 mm, roll product, bulk density 18 kg/m$^3$, micropore diameter at maximum peak 23 μm, micropore volume per unit mass 4.4 mL/g, porosity 92%) was led to pass continuously through the roll gap. Above the roll gap, provided was a coating material flow stopper (not shown) so that the coating material can stay within a range of 60 mm in the width direction over by 5 mm each than each edge of the sheet, and the catalyst precursor coating material 2 was supplied so as to all the time stay in the height of 30 mm or more for impregnation. After the carrying step, the fiber sheet was processed in the same manner as in Example 2-2, except that the excess coating material removing step was omitted. The dispersed particle diameter in the coating material and the coating material viscosity are as shown in Table 4.

Example 2-11

This was carried out in the same manner as in Example 2-2, except that the thin-film revolution-type high-speed mixer treatment was at a peripheral speed of 20 m/s and for 15 seconds, and that the viscosity was 120 mPa·s, the coating material solid content was 40% by mass, and the dispersed particle diameter was 1.8 μm.

Example 2-12

This was carried out in the same manner as in Example 2-2, except that, in the coating material preparation step, the powdery catalyst precursor 1 was 13.3 g, the binder was 16.6 g, the solvent was 1.1 g, the polymer surfactant was 4.0 g, the coating material solid content was 48% by mass, and the viscosity was 185 mPa·s. The dispersed particle diameter in the coating material is as shown in Table 4.

Example 2-13

This was carried out in the same manner as in Example 2-2, except that, in the drying step, the surface and the back of the fibrous structure were constrained each by the above-mentioned PTFE-coated stainless plate, and hot-pressed therebetween under a pressure of 0.5 MPa at 120° C. for 5 minutes (using LaboPress P2-30T, manufactured by Toyo Seiki Co., Ltd.) for micropore volume control to a compression ratio (thickness before compression/thickness after compression) of 1.3.

Example 2-14

This was carried out in the same manner as in Example 2-13, except that the compression ratio in the drying step for micropore volume control was 2.

Example 2-15

36 g of the powdery catalyst precursor 1 obtained in Production Example 1, 45 g of a binder, silica sol (Snowtex (registered trademark) ST-20, manufactured by Nissan Chemical Industries, Ltd., solid content 20% by mass), 58.5 g of a solvent, deionized water, and 10.5 g of isopropyl alcohol were put into a 250-mL plastic container (1-4658-04, manufactured by As One Corporation) and sealed up, and using a testing disperser (manufactured by Toyo Seiki Co., Ltd., according to JIS K5101-1-2), and using 160 g of titania beads having a diameter of 0.8 mm as a dispersion medium, this was treated for 30 minutes to prepare a catalyst precursor coating material containing the catalyst precursor and having a solid content of 30% by mass. The solid content mass ratio of the catalyst precursor and the binder was 80/20. The catalyst precursor coating material was analyzed through laser diffractometry, and the particle size distribution thereof had a maximum peak at 1 μm. The coating material viscosity is as shown in Table 4.

The catalyst precursor coating material was evaluated in the same manner as in Example 2-1, except that, as the fiber sheet in the impregnation step, used was a sheet formed of calcia-magnesia-silica fibers (Super Wool 607, manufactured by Shin-Nippon Thermal Ceramics Co., Ltd., 20 mm×5 mm, thickness 1.0 mm, bulk density 210 kg/m$^3$, micropore diameter 58 μm, micropore volume per unit mass 3.6 mL/g, porosity 72%), and that the size of the fiber sheet in the shape working step was 10 mm×2.5 mm and the thickness thereof was 1.0 mm.

Comparative Example 2-1

This was carried out in the same manner as in Example 2-1, but in the coating material preparation step, the components were premixed but not ground into particles. The dispersed particle diameter in the coating material was about 170 μm and was large, and the viscosity was more than 600 mPa·s, and therefore, the mixture could no more be used for the subsequent impregnation step and other steps.

Comparative Example 2-2

This was carried out in the same manner as in Example 2-4, but before the drying step, the solvent was removed by using a PTFE-made roll having a width of 70 mm and a diameter of 35 mm (EA523M-2, manufactured by ESCO Co., Ltd.). In the step, the roll was moved from one end to the other end of the fibrous structure while a load of 9.8 N was applied thereto. The dispersed particle diameter in the coating material and the coating material viscosity are as shown in Table 4.

Comparative Example 2-3

This was carried out in the same manner as in Example 2-2, except that the coating material removal was omitted and the drying step was carried out at 25° C. and for 12 hours. The dispersed particle diameter in the coating material and the coating material viscosity are as shown in Table.

Comparative Example 2-4

This was carried out in the same manner as in Example 2-2, except that the solid content in the coating material preparation step was controlled to be 10% by mass with deionized water and the viscosity was less than 1 mPa·s.

Comparative Example 2-5

This was carried out in the same manner as in Example 2-1, except that, in the coating material preparation step, the powdery catalyst precursor was 16.8 g, the binder, silica sol (Snowtex (registered trademark) ST-40, manufactured by Nissan Chemical Industries, Ltd., solid content 40% by mass) was 10.5 g, the solvent was 2.7 g, the polymer surfactant was 5.0 g, and the solid content of the catalyst precursor and the binder relative to the entire coating material was 60% by mass; however, the coating material viscosity was more than 600 mPa·s and particles could not be formed, and therefore, the mixture could no more be used for the subsequent impregnation step and other steps.

Comparative Example 2-6

This was carried out in the same manner as in Example 2-1, except that the thin-film revolution-type high-speed mixer treatment was at a peripheral speed of 20 m/s and for 15 seconds, and that the viscosity was 70 mPa·s, and the dispersed particle diameter was 2.6 µm. The dispersed particle diameter in the coating material and the coating material viscosity are as shown in Table 4.

Comparative Example 2-7

This was carried out in the same manner as in Example 2-1, except that the thin-film revolution-type high-speed mixer treatment was at a peripheral speed of 10 m/s and for 15 seconds, and that the viscosity was 40 mPa·s, and the dispersed particle diameter was 4.4 µm. The dispersed particle diameter in the coating material and the coating material viscosity are as shown in Table 4.

Comparative Example 2-8

This was carried out in the same manner as in Example 2-1, except that the amount of the polymer surfactant was 7% by mass, the powdery catalyst precursor was 11.2 g, the binder, silica sol (Snowtex (registered trademark) ST-20, manufactured by Nissan Chemical Industries, Ltd., solid content 20% by mass) was 14.0 g, the solvent, deionized water was 7.8 g, the dispersant, polymer surfactant (KAO-CER (registered trademark) 2100, manufactured by Kao Corporation) was 2.0 g. The dispersed particle diameter in the coating material and the coating material viscosity are as shown in Table 4.

The difference in the production step between Examples and Comparative Examples is collectively shown in Table 4. The fibrous structures used, MC Paper (manufactured by Nippon Sheet Glass Co., Ltd.), Isowool (registered trademark) 1260 Ace Paper (manufactured by Isolite Insulating Products Co., Ltd.) and Super Wool 607 (manufactured by Shin-Nippon Thermal Ceramics Co., Ltd.) are expressed as MCP, AP and SW, respectively. The amount of the carried catalyst metal compound and binder in the resultant catalyst fibrous structure, the micropore diameter at the maximum peak and the micropore volume at the maximum peak micropore diameter therein are shown along with the following evaluation relating to the carrying performance of the catalyst metal compound and the binder inside the structure.

TABLE 4

| | | Example | | | | | | | |
|---|---|---|---|---|---|---|---|---|---|
| | | 2-1 | 2-2 | 2-3 | 2-4 | 2-5 | 2-6 | 2-7 | 2-8 |
| Catalyst Metal Compound | | Ni/Si | Ni/Si | Ni/Si | Ni/Si | Ni/Si | Ni/Si | Co—Y—Pd | Ni/Si |
| Support | | MCP | MCP | MCP | MCP | MCP | AP | MCP | SW |
| Support Micropore Diameter | µm | 23 | 23 | 23 | 23 | 23 | 38 | 23 | 58 |
| Porosity | % | 92 | 92 | 92 | 92 | 92 | 87 | 92 | 72 |
| Total Micropore Volume | mL/g | 4.4 | 4.4 | 4.4 | 4.4 | 4.4 | 4.1 | 4.4 | 3.6 |
| Binder | | $SO_2$ sol | $SO_2$ sol | $SO_2$ sol | $SO_2$ sol | $SO_2$ sol | $SO_2$ sol | $SO_2$ sol | $SO_2$ sol |
| Binder Ratio | mass % | 20 | 20 | 20 | 20 | 20 | 20 | 20 | 20 |
| Dispersant | mass % | 12 | 12 | 12 | 12 | 12 | 12 | 0 | 12 |
| Particle Formation for Coating Material | | yes | yes | yes | yes | yes | yes | yes | yes |
| Coating Material Particle Diameter | µm | 0.8 | 0.7 | 0.7 | 0.7 | 0.7 | 0.8 | 0.9 | 0.6 |
| Solid Content in Catalyst Coating Material | mass % | 38 | 40 | 30 | 20 | 10 | 20 | 20 | 35 |
| Coating Material Viscosity | mPa·s | 130 | 140 | 105 | 70 | 29 | 70 | 102 | 88 |
| Impregnation | | possible | possible | possible | possible | possible | possible | possible | possible |
| Impregnation Means | | immersion | immersion | immersion | immersion | immersion | immersion | immersion | immersion |
| Excess Coating Material Removal | | no | yes | yes | yes | yes | yes | no | yes |
| Compression | | no | no | no | no | no | no | no | no |
| Compression Ratio | | — | — | — | — | — | — | — | — |
| Heating and Drying | | yes | yes | yes | yes | yes | yes | yes | yes |
| Heating and Drying Temperature | °C. | 120 | 120 | 120 | 120 | 120 | 120 | 120 | 120 |
| Calcination | | yes | yes | yes | yes | yes | yes | yes | yes |
| Calcination Temperature | °C. | 400 | 400 | 400 | 400 | 400 | 400 | 500 | 400 |
| Carried Amount | g/mL | 0.34 | 0.45 | 0.26 | 0.16 | 0.07 | 0.18 | 0.16 | 0.23 |
| Uniform Carrying to the inside | | ◯ | ◯ | ◯ | ◯ | ◯ | ◯ | ◯ | ◯ |
| Micropore Diameter at Maximum Peak | µm | 22.1 | 22.1 | 23.5 | 21.4 | 20.3 | 33.2 | 23.6 | 44.8 |
| Micropore Volume at Maximum Peak Micropore Diameter | mL/g | 1.93 | 0.75 | 3.31 | 5.46 | 7.80 | 2.64 | 5.64 | 0.88 |

| | | Example | | | | | | |
|---|---|---|---|---|---|---|---|---|
| | | 2-9 | 2-10 | 2-11 | 2-12 | 2-13 | 2-14 | 2-15 |
| Catalyst Metal Compound | | Ni/Si | Ni/Si | Ni/Si | Ni/Si | Ni/Si | Ni/Si | Ni/Si |
| Support | | MCP | MCP | MCP | MCP | MCP | MCP | SW |
| Support Micropore Diameter | µm | 23 | 23 | 23 | 23 | 23 | 23 | 58 |
| Porosity | % | 92 | 92 | 92 | 92 | 92 | 92 | 72 |
| Total Micropore Volume | mL/g | 4.4 | 4.4 | 4.4 | 4.4 | 4.4 | 4.4 | 3.6 |
| Binder | | $SO_2$ sol | $SO_2$ sol | $SO_2$ sol | $SO_2$ sol | $SO_2$ sol | $SO_2$ sol | $SO_2$ sol |
| Binder Ratio | mass % | 14 | 20 | 20 | 20 | 20 | 20 | 20 |
| Dispersant | mass % | 12 | 12 | 12 | 12 | 12 | 12 | 12 |

TABLE 4-continued

| | | | | | | | | |
|---|---|---|---|---|---|---|---|---|
| Particle Formation for Coating Material | | yes | yes | yes | yes | yes | yes | yes |
| Coating Material Particle Diameter | μm | 0.7 | 0.7 | 1.8 | 0.7 | 0.7 | 0.7 | 1.0 |
| Solid Content in Catalyst Coating Material | mass % | 40 | 40 | 40 | 48 | 40 | 40 | 30 |
| Coating Material Viscosity | mPa·s | 108 | 140 | 120 | 185 | 140 | 140 | 140 |
| Penetration | | possible | possible | possible | possible | possible | possible | possible |
| Penetration Means | | immersion | roll | immersion | immersion | immersion | immersion | immersion |
| Excess Coating Material Removal | | yes | no | yes | yes | yes | yes | no |
| Compression | | no | no | no | no | yes | yes | no |
| Compression Ratio | | — | — | — | — | 1.3 | 2 | — |
| Heating and Drying | | yes | yes | yes | yes | yes | yes | yes |
| Heating and Drying Temperature | °C. | 120 | 120 | 120 | 120 | 120 | 120 | 120 |
| Calcination | | yes | yes | yes | yes | yes | yes | yes |
| Calcination Temperature | °C. | 400 | 400 | 400 | 400 | 400 | 400 | 400 |
| Carried Amount | g/mL | 0.47 | 0.43 | 0.39 | 0.59 | 0.53 | 0.70 | 0.39 |
| Uniform Carrying to the inside | | ○ | ○ | ○ | ○ | ○ | ○ | ○ |
| Micropore Diameter at Maximum Peak | μm | 22.1 | 22.8 | 21.4 | 22.8 | 16.9 | 8.9 | 60.7 |
| Micropore Volume at Maximum Peak Micropore Diameter | mL/g | 1.42 | 1.36 | 1.45 | 0.80 | 1.49 | 0.60 | 4.10 |

| | | Comparative Example | | | | | | | |
|---|---|---|---|---|---|---|---|---|---|
| | | 2-1 | 2-2 | 2-3 | 2-4 | 2-5 | 2-6 | 2-7 | 2-8 |
| Catalyst Metal Compound | | Ni/Si | Ni/Si | Ni/Si | Ni/Si | Ni/Si | Ni/Si | Ni/Si | Ni/Si |
| Support | | MCP | MCP | MCP | MCP | MCP | MCP | MCP | MCP |
| Support Micropore Diameter | μm | 23 | 23 | 23 | 23 | 23 | 23 | 23 | 23 |
| Porosity | % | 92 | 92 | 92 | 92 | 92 | 92 | 92 | 92 |
| Total Micropore Volume | mL/g | 4.4 | 4.4 | 4.4 | 4.4 | 4.4 | 4.4 | 4.4 | 4.4 |
| Binder | | $SO_2$ sol | $SO_2$ sol | $SO_2$ sol | $SO_2$ sol | $SO_2$ sol | $SO_2$ sol | $SO_2$ sol | $SO_2$ sol |
| Binder Ratio | mass % | 20 | 20 | 20 | 20 | 20 | 20 | 20 | 20 |
| Dispersant | mass % | 12 | 12 | 12 | 12 | 12 | 12 | 12 | 7 |
| Particle Formation for Coating Material | | no | yes | yes | yes | impossible | yes | yes | yes |
| Coating Material Particle Diameter | μm | 171 | 0.7 | 0.7 | 0.7 | — | 2.6 | 4.4 | 1.1 |
| Solid Content in Catalyst Coating Material | mass % | 40 | 20 | 40 | 10 | 60 | 40 | 40 | 40 |
| Coating Material Viscosity | mPa·s | 600< | 70 | 140 | <1 | 600< | 70 | 40 | 250 |
| Penetration | | impossible | possible | possible | possible | impossible | possible | possible | possible |
| Penetration Means | | — | immersion | immersion | immersion | immersion | immersion | immersion | immersion |
| Excess Coating Material Removal | | — | no | no | yes | — | no | no | no |
| Compression | | — | no | no | no | — | no | no | no |
| Compression Ratio | | — | — | — | — | — | — | — | — |
| Heating and Drying | | — | solvent removal | no | yes | — | yes | yes | yes |
| Heating and Drying Temperature | °C. | — | 120 | 25 | 120 | — | 120 | 120 | 120 |
| Calcination | | — | yes | yes | yes | — | yes | yes | yes |
| Calcination Temperature | °C. | — | 400 | 400 | 400 | — | 400 | 400 | 400 |
| Carried Amount | g/mL | — | 0.12 | 0.33 | 0.06 | — | 0.22 | 0.26 | 0.38 |
| Uniform Carrying to the inside | | — | X | X | X | — | X | X | X |
| Micropore Diameter at Maximum Peak | μm | — | 20.4 | 21.6 | 20.8 | — | 24.3 | 23.5 | — |
| Micropore Volume at Maximum Peak Micropore Diameter | mL/g | — | 6.30 | 2.18 | 6.82 | — | 2.62 | 4.27 | — |

Figure 7:
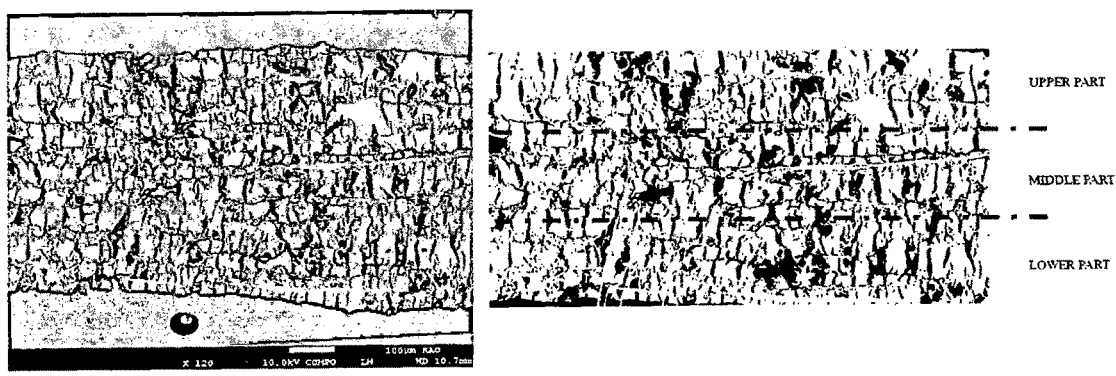
FIG. 7 shows electronic microscopic photographs of a cross section of the catalyst fibrous structure obtained in Example 2-2.

Carrying conditions in the catalyst fibrous structures obtained in Examples and Comparative Examples were confirmed through cross section observation. Example 2-2 is taken as an example. The obtained image (FIG. 7) was digitalized, and a part carrying the catalyst metal compound and the binder was separated from a part with voids existing therein. The obtained image was divided into three parts in the thickness direction of the catalyst fibrous structure, and the void ratio of each part was calculated. The upper part had a ratio of 29%; the middle part had a ratio of 35%; and the lower part had a ratio of 27%. The difference between the maximum value and the minimum value from these parts was 8%, which confirmed uniform carrying in the thickness direction of the catalyst fibrous structure. The case where similar uniform carrying was confirmed was evaluated as good and expressed as "○".

Figure 8:
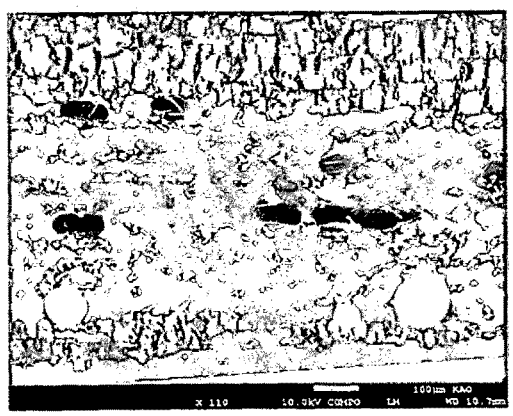
FIG. 8 is an electronic microscopic photograph of a cross section of the catalyst fibrous structure obtained in Comparative Example 2-2.

Similarly, in the image of the catalyst fibrous structure obtained in Comparative Example 2-2 (FIG. 8), the porosity was compared. In this, the porosity was 38% in the upper part, 74% in the middle part and 65% in the lower part. The difference between the maximum value and the minimum value was 36%, from which it was confirmed that the voids existed unevenly inside the catalyst fibrous structure, and the catalyst metal compound and the binder were not carried uniformly. The case was evaluated as bad and expressed as "×". It is known that, in the catalyst fibrous structures obtained according to the production method of the present invention, the catalyst metal compound and the binder are carried uniformly throughout the inside of the structure. The results are shown in Table 5. Of the items in Table 5, unevenness means [(difference between maximum value and minimum value)/void ratio]×100.

TABLE 5

| | | Example 2-2 | Comparative Example 2-2 |
|---|---|---|---|
| Carried Amount | g/mL | 0.45 | 0.12 |
| Void Ratio in Entire Area | % | 33 | 60 |
| Upper Part | % | 29 | 38 |
| Middle Part | % | 35 | 74 |
| Lower Part | % | 27 | 65 |
| Difference between Maximum Value and Minimum Value | | 8 | 36 |
| Unevenness | % | 25 | 60 |

TABLE 5-continued

| | Example 2-2 | Comparative Example 2-2 |
|---|---|---|
| Uniform Carrying throughout the inside | ○ | x |

The strength of the catalyst fibrous structure was evaluated by adding ultrasonic vibration to the catalyst fibrous structure in a solvent to thereby impart pseudo load thereto, followed by comparing the mass before and after the loading. The mass of the catalyst fibrous structure of 25 mm×50 mm was previously measured, the catalyst fibrous structure was put into a glass bottle (PYREX (registered trademark) No. 1395, 100 mL, φ55×80 mm, manufactured by Corning Inc.), and immersed in 100 g of acetone. Two such glass bottles were arranged in an ultrasonic washer (SU-6TH, manufactured by Shibata Scientific Technology Ltd.), and ultrasonic vibration of a frequency 28 kHz was imparted thereto for 30 minutes. After 30 minutes, the catalyst fibrous structure was taken out, dried in air at 120° C. for 30 minutes, and after the drying, the mass thereof was measured. From the mass difference before and after the ultrasonic vibration, the drop-off rate was evaluated. (Mass before ultrasonic vibration−mass after ultrasonic vibration)/ mass before measurement=drop-off rate). The catalyst fibrous structure obtained in Example 2-1 was evaluated, and the drop-off rate was 1.3%. The drop-off rate in the catalyst fibrous structure obtained in Comparative Example 2-7 was 12.7%. In the catalyst fibrous structure produced according to the production method of the present invention, the catalyst metal compound and the binder were firmly carried by the structure, and it is considered that the catalyst would not drop off so much from the structure during use.

The catalyst fibrous structure obtained in Example 2-2 was activated in the manner mentioned below, and used for decomposition of sulfur compounds in fat to evaluate the performance of the catalyst fibrous structure.

<Vapor-Phase Reduction>

Using an atmospheric furnace (MBA-2040D-SP, manufactured by Motoyama Co., Ltd.), the catalyst fibrous structure was treated in a 4% hydrogen atmosphere at 450° C. for 5 hours and then treated in a 1% oxygen atmosphere at 25° C. for 8 hours for vapor-phase reduction.

<Liquid-Phase Reduction>

0.9 g of the catalyst fibrous structure of Example 2-2 was charged in a 500-mL autoclave in such a manner that 0.3 g of Ni metal was present in the catalyst fibrous structure, and in 200 g of 1-dodecanol, this was processed for liquid-phase reduction in a 1.0 MPa hydrogen atmosphere at 200° C., at an autoclave stirring number of 900 rpm for 2 hours.

<Decomposition Reaction>

In a 500-mL autoclave, 9.0 g of the catalyst fibrous structure that had been processed for liquid-phase reduction was charged so that 0.3 g of Ni metal was present. As the source material, a crude oil of palm kernel oil was used, and this was processed at 170° C., at 2.0 MPa, and at a hydrogen flow rate of 5 NL/min, for 4 hours. The sulfur compound concentration at the end of the reaction (end-point sulfur compound concentration) was determined to evaluate the catalyst fibrous structure. The sulfur compound concentration in the source material used is 3.5 ppm.

The sulfur compound amount (end-point sulfur compound concentration) in the reaction product was measured, using a low-concentration sulfur analyzer (product name; 9000LLS, manufactured by AnTek Products Corporation). During the analysis, the combustion temperature was 1050° C. and the voltage of the UV detector was 840 V. After 4 hours, the sulfur compound concentration was 0.2 ppm, and the catalyst exhibited good performance.

<Decomposition Reaction in Fixed Bed>

The catalyst fibrous structure obtained in Example 2-15 was charged in a reactor tube having an inner diameter of 13 mm in such a manner that the apparent volume of the charged part became 12 mL, and according to a continuous fixed-bed process, a test of desulfurization of a fatty acid ester (sulfur concentration=2.6 ppm) was carried out. As the source material, used was purified palm kernel oil. The reaction condition was 20 MPa, and 155° C. The material flow rate was g/h, and the hydrogen flow rate was 132 NL/h. The desulfurization activity per mass of the active catalyst metal was defined as follows.

Desulfurization activity=Log {(sulfur concentration before desulfurization treatment)/(sulfur concentration after desulfurization treatment)}/(mass of charged Ni/apparent volume in charged part), wherein "Log" represents a natural logarithm.

The initial activity per unit Ni amount is 32.3, whilst the activity per unit Ni amount after liquid passing at 1500 g-source material/g-Ni was 22.4, and the activity retentivity was 69.3%.

The invention claimed is:

1. A catalyst fibrous structure having a catalyst metal carried on a fibrous structure, which satisfies all the following requirements (a), (b) and (c):
    (a) a Log differential micropore volume distribution curve thereof obtained by measurement using a mercury intrusion technique has its maximum peak at a micropore diameter in the range of from 10 μm to 70 μm,
    (b) a Log differential micropore volume at the peak is 0.5 mL/g or more, and
    (c) an amount of a catalyst metal compound and a binder carried per unit volume is from 0.1 g/mL to 0.6 g/mL, wherein the fibrous structure is a fiber sheet, and
    wherein the fibrous structure comprises at least one type selected from silica fibers, alumina fibers, alumina-silica fibers, calcia-magnesia-silica fibers, glass fibers and carbon fibers, or mixed fibers of a combination of two or more types selected from silica fibers, alumina fibers, alumina-silica fibers, calcia-magnesia-silica fibers, glass fibers and carbon fibers.

2. The catalyst fibrous structure according to claim 1, wherein the Log differential micropore volume at the peak is 0.7 mL/g or more.

3. The catalyst fibrous structure according to claim 1, wherein the fibrous structure contains a combination of alumina-silica fibers and glass fibers.

4. The catalyst fibrous structure according to claim 1, wherein the fibrous structure contains alumina-silica fibers.

5. The catalyst fibrous structure according to claim 1, wherein the fibrous structure contains calcia-magnesia-silica fibers.

* * * * *